US010566645B2

(12) United States Patent
Watanabe

(10) Patent No.: US 10,566,645 B2
(45) Date of Patent: Feb. 18, 2020

(54) FUEL-CELL SEPARATOR WITH A FLUID SUPPLY AND DIFFUSION LAYER FORMED BY A POROUS LAYER ON AT LEAST ONE FACE OF A FLAT METAL PLATE AND CELL STACK THAT INCLUDES THE FUEL-CELL SEPARATOR

(71) Applicant: UNIVERSITY OF YAMANASHI, Kofu-shi, Yamanashi (JP)

(72) Inventor: Masahiro Watanabe, Kofu (JP)

(73) Assignee: UNIVERSITY OF YAMANASHI, Yamanashi (JP)

(*) Notice: Subject to any disclaimer, the term of this patent is extended or adjusted under 35 U.S.C. 154(b) by 210 days.

(21) Appl. No.: 15/156,853

(22) Filed: May 17, 2016

(65) Prior Publication Data
US 2016/0260987 A1 Sep. 8, 2016

Related U.S. Application Data

(63) Continuation-in-part of application No. PCT/JP2014/080995, filed on Nov. 18, 2014.

(30) Foreign Application Priority Data

Nov. 18, 2013 (JP) ................. 2013-238026

(51) Int. Cl.
*H01M 8/0202* (2016.01)
*H01M 8/2465* (2016.01)
(Continued)

(52) U.S. Cl.
CPC ....... *H01M 8/2465* (2013.01); *H01M 8/0258* (2013.01); *H01M 8/0267* (2013.01)

(58) Field of Classification Search
None
See application file for complete search history.

(56) References Cited

U.S. PATENT DOCUMENTS 6,566,004 B1 * 5/2003 Fly .................. H01M 8/0232
429/434
2004/0043285 A1 * 3/2004 Nagoshi ............ H01M 4/8605
429/465
(Continued)

FOREIGN PATENT DOCUMENTS

JP 2004-186116 A 7/2004
JP 2005-293944 A 10/2005
(Continued)

OTHER PUBLICATIONS

JP2005-293944A En translation (Year: 2005).*
(Continued)

*Primary Examiner* — Lucas J. O'Donnell
(74) *Attorney, Agent, or Firm* — Birch, Stewart, Kolasch & Birch, LLP

(57) ABSTRACT

Separators of multiple types capable of supplying and diffusing fluids such as an anode gas, cathode gas and coolant uniformly are prepared and combined to construct a fuel cell stack. Such a cell stack (20) for fuel cells includes separators of at least two types (types CA, C, A, C, CW and AW) for anode gas and cathode gas. Each separator is such that a corrosion-resistance layer is formed on at least one face of a metal plate (30) and a fluid supply and diffusion layer for the corresponding gas is formed by an electrically conductive porous layer on the corrosion-resistant layer. The at least two separators are stacked so as to face each other with at least an electrolyte membrane and catalyst layers on both sides of the membrane (a new membrane electrode assembly N-MEA) being sandwiched between the fluid supply and diffusion layers of the separators.

38 Claims, 32 Drawing Sheets

(51) Int. Cl.
*H01M 8/0258* (2016.01)
*H01M 8/0267* (2016.01)

(56) References Cited

U.S. PATENT DOCUMENTS

| | | | | |
|---|---|---|---|---|
| 2009/0053573 | A1* | 2/2009 | Shibata | H01M 8/0247 429/481 |
| 2010/0035122 | A1* | 2/2010 | Yamamoto | H01M 8/0254 429/406 |
| 2012/0301810 | A1 | 11/2012 | Kawajiri et al. | |
| 2013/0288151 | A1* | 10/2013 | Yoshizawa | H01M 8/0247 429/480 |
| 2014/0178785 | A1* | 6/2014 | Jang | H01M 8/241 429/434 |
| 2015/0010840 | A1* | 1/2015 | Roshanzamir | H01M 8/04029 429/437 |

FOREIGN PATENT DOCUMENTS

| | | |
|---|---|---|
| JP | 2009-009731 A | 1/2009 |
| JP | 2009-099371 A | 5/2009 |
| JP | 2011-150801 A | 8/2011 |
| JP | 2013-077422 A | 4/2013 |

OTHER PUBLICATIONS

International Search Report (PCT/ISA/210) issued in PCT/JP2014/080995, dated Feb. 24, 2015.
Written Opinion (PCT/ISA/237) issued in PCT/JP2014/080995, dated Feb. 24, 2015.
International Preliminary Report on Patentability for Application No. PCT/JP2014/080995, dated Jun. 2, 2016, with English language translation.

* cited by examiner

PRIOR ART

FUEL-CELL SEPARATOR WITH A FLUID SUPPLY AND DIFFUSION LAYER FORMED BY A POROUS LAYER ON AT LEAST ONE FACE OF A FLAT METAL PLATE AND CELL STACK THAT INCLUDES THE FUEL-CELL SEPARATOR

CROSS REFERENCE TO RELATED APPLICATIONS

This application is a Continuation-in-Part of PCT International Application No. PCT/JP2014/080995, filed on Nov. 18, 2014, which claims priority under 35 U.S.C. 119(a) to Patent Application No. 2013-238026, filed in Japan on Nov. 18, 2013, which are hereby expressly incorporated by reference into the present application.

BACKGROUND OF THE INVENTION

Field of the Invention

This invention relates to a separator serving as a constituent member of a fuel cell as well as a cell stack obtained by combining constituent members that include these separators.

Description of the Related Art

FIG. 35 illustrates the basic structure of single cell constituting a conventional polymer electrolyte fuel cell (PEFC).

A single cell 90 is constructed by bringing ribbed separators (RS) 98 into pressing contact with respective ones of both sides of a membrane electrode assembly (MEA) 91. The membrane electrode assembly (MEA) 91 is arranged and integrated by pressure-bonding or hot-pressing an anode 93 and a cathode 94 onto respective ones of both sides of a polymer electrolyte membrane 92 (PEM). The anode 93 and cathode 94 each comprise a catalyst layer (CL) 95, a porous (microporous) layer (MPL) 96 and a gas diffusion layer (GDL) 97. Since the output voltage of the single cell theoretically is a maximum of 1.2V, a high output voltage is obtained by stacking such single cells.

The separators 98 function to achieve electrical connection to the + electrode (cathode) and − electrode (anode) of adjoining single cells and to supply a cathode gas (air, oxygen) and an anode gas (fuel, hydrogen) to respective ones of both electrodes from gas flow paths provided in the separator surfaces.

Typically the gas diffusion layer (GDL) 97 is composed of carbon paper or woven or non-woven cloth of carbon fibers that has been rendered partially water-repellant using fluorocarbon resin (PTFE) or the like. Typically the porous layer (MPL) 96 is a porous layer comprising fine particles of carbon rendered suitably water-repellant (or hydrophilic) and controlled in terms of pore diameter and functions to form a catalyst layer of uniform thickness, to supply reactant gas to the catalyst reaction layer or to perform smooth mass transfer of catalyst reaction product (water that has been produced). Further, the catalyst layer (CL) 95 is obtained by coating the surface of the electrolyte (PEM) or the surface of the porous membrane (MPL) with a catalyst (Pt/CB) having nanometer-sized particles of platinum supported in highly dispersed fashion on a carrier of fine carbon particles, the coating being achieved using an electrically conductive ionomer (such as Nafion) as a binder. The reactivity of the catalyst per se, in particular the oxygen-reduction reactivity (ORR), and the rate at which oxygen and protons are supplied to the catalyst layer are important factors that determine cell performance. Reactant gases (hydrogen, oxygen) from the gas flow paths of the separators 98 are supplied to the catalyst layer (CL) 95 through the gas diffusion layers (GDL) 97 and porous layers (MPL) 96. Water produced is discharged along the reverse path.

An example of a separator is one in which flow paths are formed by machining a graphitized carbon plate treated so as to be impermeable to gas. Although a separator of this kind exhibits excellent performance in terms of electrical conductivity, corrosion resistance and reliability, it is difficult to make the separator more compact and the cost thereof is two orders of magnitude higher than that required for mass production of fuel cell vehicles (FCV) and the like. Development of a low-cost alternative is essential.

Heat/pressure-molded products of carbon material/resin composites and metal-molded products subjected to treatment for surface corrosion resistance have been proposed thus far. However, it is difficult to achieve both a thin film and mechanical strength with the former. In the case of the latter, the formation of electrically conductive protrusions in the oxide film on a stainless steel surface, plating with noble metal and cladding with corrosion-resistant metal have been attempted. Nevertheless, although compactness is satisfactory, major issues remain in terms of corrosion resistance and cost.

In any case, groove-shaped gas flow paths are formed in the separator surfaces, as illustrated in FIG. 35. Even if the separator itself is a simple flat metal plate, a body formed to have groove-shaped gas flow paths is joined to the flat metal plate (for example, see Patent Document 1).

Patent Document 1: Japanese Patent Application Laid-Open No. 2011-150801

Thus, with a structure in which the cathode gas or anode gas is supplied through groove-shaped gas flow paths, these gases are localized along the flow paths. Accordingly, a gas diffusion layer or the like for uniformly diffusing these gases toward the catalyst layers and electrolyte membrane is essential. A gas diffusion layer comprising a carbon fiber material or the like is a cause of higher cost.

SUMMARY OF THE INVENTION

An object of the present invention is to provide a separator which, in addition to having a function for supplying fluids such as cathode gas, anode gas and coolant, is equipped with a function for diffusing these fluids.

The present invention further provides a separator the structure of which enables these fluids to be supplied and diffused as uniformly as possible.

The present invention further provides separators of various forms as a cathode, anode or for supplying a coolant, or which achieve these applications in combination.

The present invention further provides a fuel cell stack formed by stacking the various separators set forth above as well as other components.

A separator for a fuel cell according to a first aspect of the present invention is such that a fluid supply and diffusion layer is formed by a (micro) porous layer on at least one face of a metal plate, and an equalization layer (equalization portion) extending in a direction that intersects (obliquely or orthogonally) a direction from a fluid supply side to a fluid discharge side is formed on the fluid supply and diffusion layer, as a part thereof, on at least the fluid supply side.

The fluid supply and diffusion layer comprised of the porous layer is formed on the separator per se. According to this separator, therefore, various fluids (cathode gas, anode gas, coolant) used in a fuel cell can be supplied and can be diffused over the entire surface of the fluid supply and diffusion layer. Further, since the equalization layer (equalization portion) extending in a direction that intersects the direction from the fluid supply side to the fluid discharge side is formed on the fluid supply and diffusion layer, as a part thereof, on at least the fluid supply side, it is possible to distribute the fluid over the entire surface of the fluid supply and diffusion layer substantially uniformly. In the case of a gas, the gas can be supplied to the cathode side and anode side efficiently; in the case of a coolant, cooling can be achieved substantially uniformly in the surface direction. In an embodiment, the equalization layer also is a (micro) porous layer. Accordingly, the fluid is diffused also in the equalization layer as a matter of course, and this contributes to power generation, current collection and cooling.

In a preferred embodiment of the present invention, the periphery of at least one face of the metal plate is surrounded by a dense frame, preferably by an electronically conductive dense frame, the fluid supply and diffusion layer is formed over the substantially entire surface within the dense frame with the exception of a fluid supply port (inlet) and discharge port (outlet), and the equalization layer extends over the full width of the dense frame.

Since the periphery of the fluid supply and diffusion layer is surrounded by the dense frame, leakage of fluid can be prevented. Because the equalization layer is provided over the full width of the dense frame, it is possible to reliably equalize fluid pressure or flow rate. Since the fluid supply and diffusion layer is provided over the entire surface within the dense frame (with the exception of the fluid supply port and discharge port), the effective reaction regions of the cathode and anode can be utilized fully. This contributes to power generation and current collection to the maximum extent. In addition, when the separators and other components are stacked, as will be described later, mechanical strength can be well maintained since there will be no spaces such as grooves.

In a further embodiment of the present invention, a corrosion-resistant layer is formed on at least one face of the metal plate (although it is much more preferable to form the layer on both faces of the plate), and the fluid supply and diffusion layer is formed on the corrosion-resistant layer. Corrosion resistance of the metal plate is thus enhanced. A corrosion-resistant layer may be formed also on the inner peripheral surface of a fluid supply hole and discharge hole formed in the metal plate.

In an embodiment of the present invention, the fluid supply and diffusion layer and the equalization layer are electrically conductive porous layers. Furthermore, the corrosion-resistant layer on the metal plate, and preferably the dense frame, both exhibit electrical conductivity. The separator will thus exhibit a current collecting capability (function) over the entirety thereof.

In an embodiment, the fluid supply and diffusion layer is a construction that includes a mixture of a conductive material and polymer resin and is cured by a hot press or hot isotropic press. Likewise, the equalization layer also is a construction that includes a mixture of a conductive material and polymer resin, and fluid resistance (porosity is one example thereof) of the equalization layer differs from that of the remaining portion. Although the corrosion-resistant layer and preferably the dense frame as well are constructions that include a mixture of a conductive material and polymer resin, these block the passage or transmittance of fluid.

Depending upon the type of fluid, there can be cases (in the case of gas, for example) where it is preferable that the fluid resistance of the equalization layer be smaller than the fluid resistance of the remainder of the fluid supply and diffusion layer, and cases (in the case of coolant, for example) where it is preferable that the fluid resistance of the equalization layer be larger than the remainder of the fluid resistance of the fluid supply and diffusion layer.

Furthermore, it is desirable to be able to change the placement of the equalization layer depending upon the type of fluid. For instance, there are cases (in the case of gas, for example) where it is better to provide the equalization layers in mutually spaced-apart relation in a region contiguous to the fluid supply port, a region contiguous to the fluid discharge port and a region between these two regions, and there are cases (in the case of coolant, for example) where it is better to provide the equalization layer in a region spaced slightly away from the supply port (namely a region neighboring the supply port) on the fluid supply side and in a region spaced slightly away from the discharge port (namely a region neighboring the discharge port) on the fluid discharge side.

In another embodiment of the present invention, the equalization layer (equalization portion) is a layer-shaped space or a groove formed inside the fluid supply and diffusion layer. The layer-shaped space or the groove may be a tunnel or a downward-facing groove. Preferably, a gas supply groove or a gas discharge groove intersects and connects to this equalization layer. These grooves are formed in the fluid supply and diffusion layer as grooves of comparatively small width.

In accordance with the present invention, separators of a variety of types can be provided.

In one type of separator, a fluid supply and diffusion layer for one of two types of reactant gas is formed on one face of the metal plate, and a fluid supply and diffusion layer for the other of the two types of reactant gas is formed on the other face of the metal plate.

In another type of separator, a fluid supply and diffusion layer for reactant gas is formed on only one face of the metal plate. In a further type of separator, a fluid supply and diffusion layer for coolant is formed on one face or on both faces of the metal plate.

In still another type of separator, a fluid supply and diffusion layer for reactant gas is formed on one face of the metal plate, and a fluid supply and diffusion layer for coolant is formed on the other face of the metal plate.

In a further embodiment of the present invention, multiple ribs comprising a (micro) porous material are formed in a region of the fluid supply and diffusion layer other than the equalization layer so as to define fluid flow paths from the fluid supply side to the fluid discharge side. Since the ribs also consist of porous material, fluid supply and diffusion is carried out by the rib portions as well. This embodiment is particularly useful for application to the coolant. The fluid resistance of the ribs per se is greater than the fluid resistance of the porous layer of the equalization layer.

There are various modifications available for the rib structure. For example, multiple ribs are formed into a wave shape, and the spacing or width of adjacent ribs varies from the fluid supply side to the fluid discharge side or from the central portion toward the sides.

Another type of separator that can be mentioned is one in which a fluid supply and diffusion layer for reactant gas is formed on one face of the metal plate and a rib structure that defines coolant flow paths is formed on the other face of the metal plate.

A separator for a fuel cell according to a second aspect of the present invention is such that a corrosion-resistant layer is formed on at least one face of a metal plate and a fluid supply and diffusion layer is formed by a (micro) porous layer on the corrosion-resistant layer.

The corrosion resistance of the metal plate is improved by forming the corrosion-resistant layer on the plate, and fluid supply and diffusion can be achieved by forming the fluid supply and diffusion layer from the porous layer.

In a preferred embodiment, the periphery of at least one face of the metal plate is surrounded by a dense frame, and the fluid supply and diffusion layer is formed on the substantially entire surface within the dense frame with the exception of a fluid supply port (inlet) and discharge port (outlet). Leakage of fluid is prevented by the dense frame, and power generation and current collection are improved by forming the fluid supply and diffusion layer on the entire surface within the dense frame (with the exception of the fluid supply port and discharge port).

In a preferred embodiment, an equalization layer (equalization portion) extending in a direction that intersects a direction from a fluid supply side to a fluid discharge side is formed on the fluid supply and diffusion layer, as a part thereof, on at least the fluid supply side. Owing to the presence of the equalization layer, the fluid can be diffused substantially uniformly. Conceptually, the equalization layer (equalization portion) includes a layer-shaped space (space layer or groove) formed inside the fluid supply and diffusion layer [where the space is a space surrounded by a wall constituted by the surface of the fluid supply and diffusion layer (at least one face of the space may be open)]. The layer-shaped space may be a tunnel or a downward-facing groove.

Preferably, the fluid supply and diffusion layer and the equalization layer are formed by electrically conductive porous layers. Furthermore, the corrosion-resistant layer, and preferably the dense frame, both exhibit electrical conductivity.

In the separators of the first and second aspects of the present invention, a (micro) porous sheet is further affixed to the surface of the fluid supply and diffusion layer of the separator. It is preferred that this porous sheet play the role of the porous layer provided on the outer surface of the catalyst layer on both sides of the electrolyte membrane in the membrane electrode assembly. In this case, the membrane electrode assembly need no longer necessarily require the porous layer.

A separator for a coolant in a fuel cell according to a third aspect of the present invention is such that an electrically conductive corrosion-resistant layer is formed on at least one face of a metal plate, a dense frame is formed on the periphery of the corrosion-resistant layer, equalization layers are formed within the dense frame in the vicinity of respective ones of a coolant supply port and discharge port over the entire width of the dense frame, and coolant flow paths are formed between the equalization layers by ribs or layers of a (micro) porous material.

It is preferred that the porous material and dense frame exhibit electrical conductivity.

All forms of the separators described above can be used to construct a cell stack for fuel cells, as will be described next.

A cell stack for a fuel cell according to a fourth aspect of the present invention includes separators of at least two types for a cathode gas and an anode gas, each separator is such that a fluid supply and diffusion layer for a corresponding gas is formed by a (micro) porous layer on at least one face of a metal plate, an equalization layer (equalization portion) extending in a direction that intersects a direction from a fluid supply side to a fluid discharge side is formed on the fluid supply and diffusion layer, as a part thereof, on at least the fluid supply side, and the at least two separators are stacked so as to face each other with at least an electrolyte membrane and catalyst layers on both sides of the membrane being sandwiched between the fluid supply and diffusion layers.

A membrane electrode assembly sandwiched by the two types of separators mentioned above may have the electrolyte membrane and the catalyst layers on both sides thereof (in a case where the separators are provided with the above-mentioned porous sheet), or a (micro) porous layer may be provided on the outer side of the catalyst layers. Since the separators per se have the fluid supply and diffusion layer, the conventional costly gas diffusing layer is no longer required. As a result, a low-cost fuel cell can be provided and it is possible to reduce the overall thickness of the cell stack.

A cell stack for fuel cells according to a fifth aspect of the present invention includes separators of at least two types for a cathode gas and an anode gas, each separator is such that a corrosion-resistant layer is formed on at least one face of a metal plate, a fluid supply and diffusion layer for a corresponding gas is formed by a (micro) porous layer on the corrosion-resistant layer, and the at least two separators are stacked so as to face each other with at least an electrolyte membrane and catalyst layers on both sides of the membrane being sandwiched between the fluid supply and diffusion layers. It is possible to eliminate the conventional costly gas diffusing layer in this cell stack as well.

In the separator of the cell stack according to the fifth aspect of the present invention, preferably an equalization layer (equalization portion) extending in a direction that intersects a direction from a gas supply side to a gas discharge side is formed on the fluid supply and diffusion layer, as a part thereof, at least on the gas supply side.

In the separator of the cell stack according to the fourth and fifth aspects of the present invention, preferably a (micro) porous sheet is further affixed to the surface of the fluid supply and diffusion layer of the separator.

In another embodiment, the fluid supply and diffusion layer is surrounded by a dense frame.

In a further embodiment, the fluid supply and diffusion layer and dense frame exhibit electrical conductivity.

In a further embodiment, further included in the stack is a separator for coolant in which a corrosion-resistant layer is formed on at least one face of a metal plate and coolant flow paths are formed by a (micro) porous material on the corrosion-resistant layer.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Figure 1:
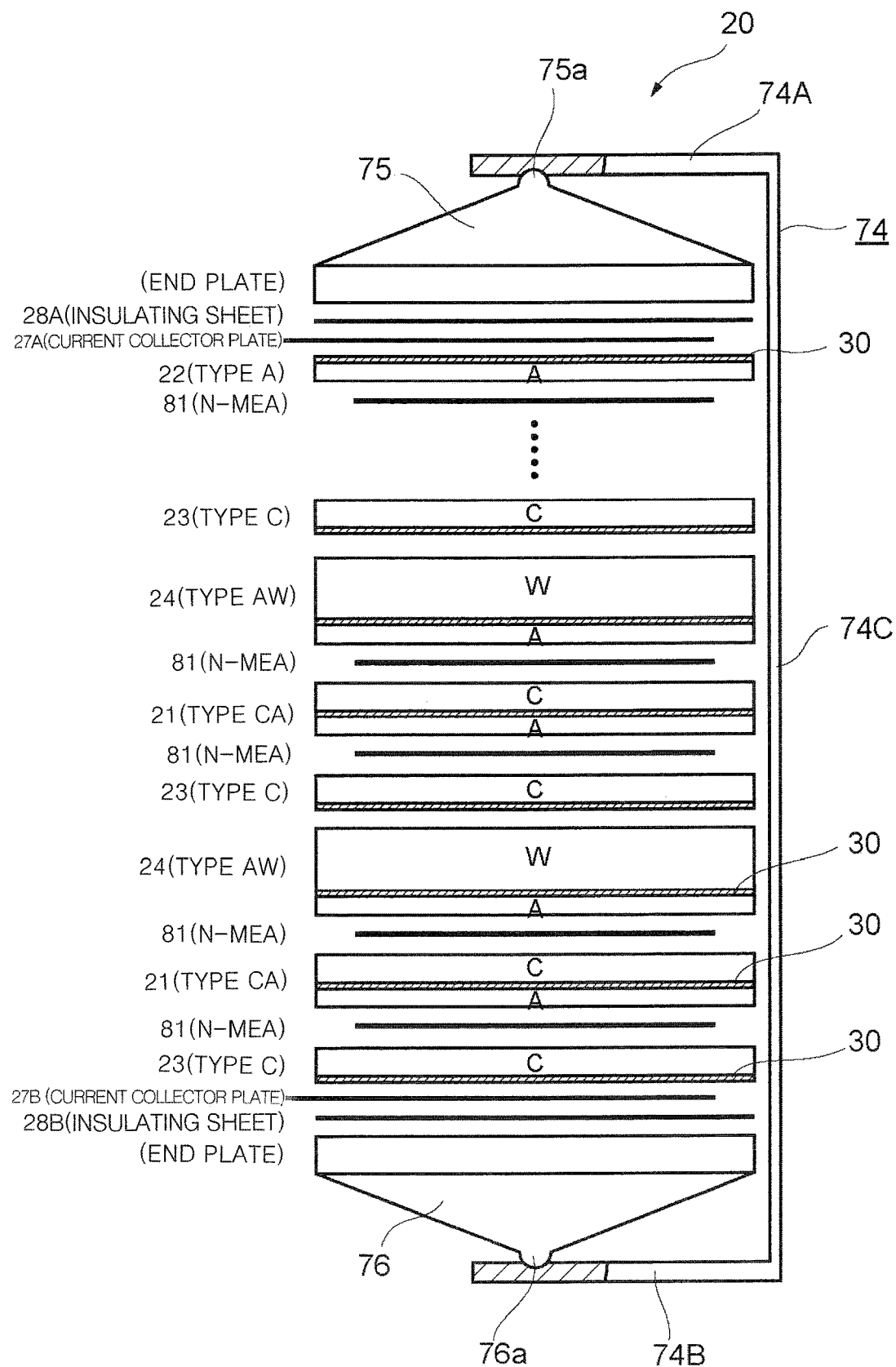
FIG. 1 is a view, seen from the front, conceptually illustrating a fuel cell stack according to an embodiment of the present invention.

Embodiments of the present invention will now be described in detail with reference to the drawings. Such components as the various separators, membrane electrode assemblies (N-MEA), insulating sheets and current collector plates that constitute a fuel cell stack have thicknesses on the order of from a hundred microns (or several hundred microns) to several millimeters (or ten millimeters) and it is impossible to illustrate these thicknesses accurately. For this reason, these thicknesses are rendered in somewhat exaggerated form in the drawings. Further, it should be understood that there are also locations represented by giving precedence to viewing simplicity and ease of comprehension with the aim of avoiding drawing that are too complex. For example, while a flat metal plate 30 is provided with hatching indicating a cross section, such hatching is omitted with regard to a fluid supply and diffusion layer or the like, and components such as thin films and sheets are rendered simply by solid bold lines. Furthermore, in FIGS. 1, 2 and 5, various separators 21, 22, 23, 24, 26, membrane electrode assemblies (N-MEA) 81, current collector plates 27A, 27B, insulating sheets 28A, 28B and end plates 75, 76 are illustrated as being spaced apart from each other in order to facilitate understanding. However, these components are joined together tightly in the order of the stacked arrangement illustrated.

Fuel Cell Stack

Figure 2:
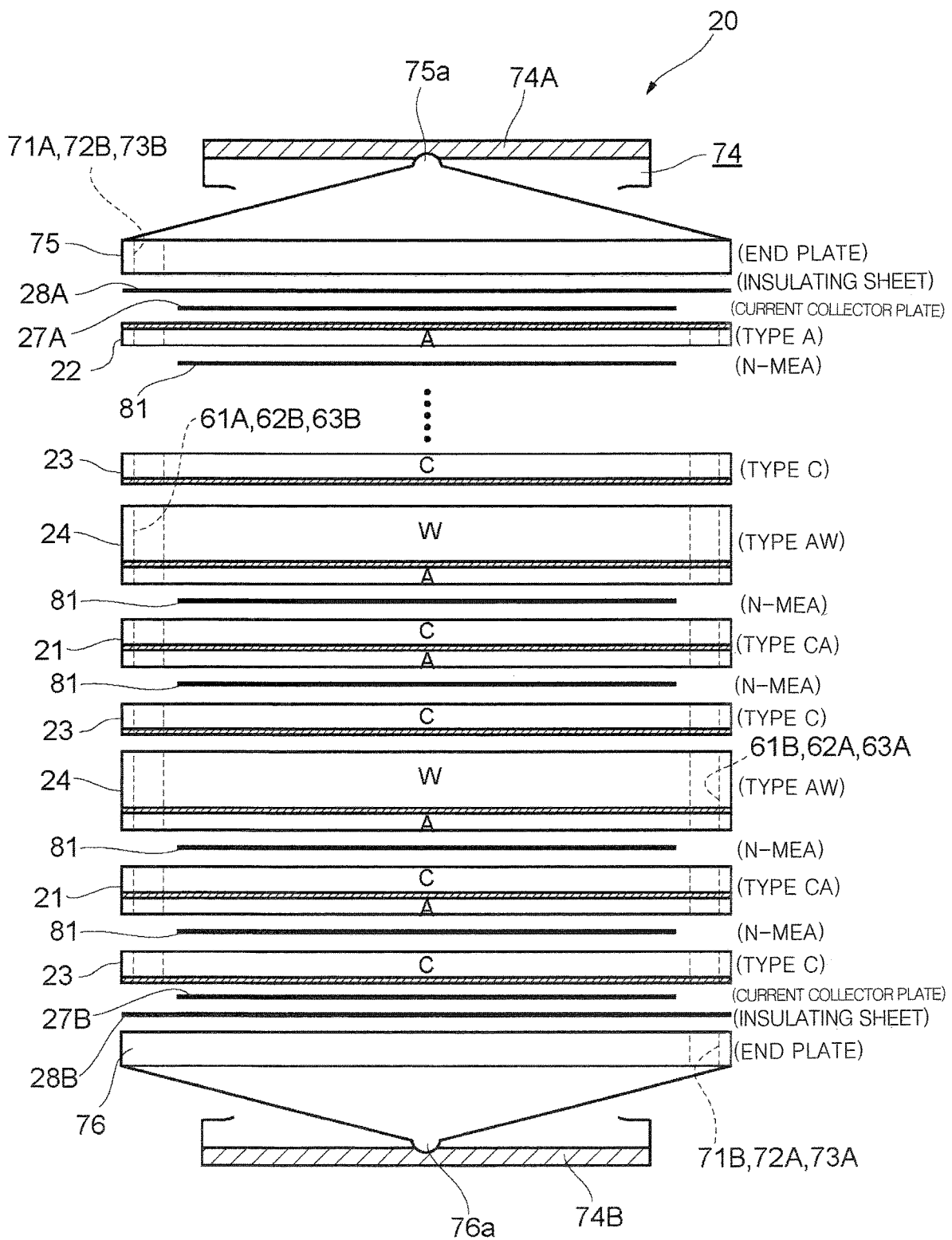
FIG. 2 is a view, seen from the side, conceptually illustrating a fuel cell stack according to an embodiment of the present invention.

FIGS. 1 and 2 conceptually illustrate a fuel cell stack 20 of an embodiment according to the present invention. Conceptually, a single cell of a fuel cell stack is constituted by an electrolyte membrane (polymer membrane) (which may include a catalyst layer), and cathode-side components and anode-side components that sandwich the electrolyte membrane. In the cell stack shown in FIGS. 1 and 2, a coolant supply and diffusion layer (indicated by reference character W) is provided every other two single cells.

The fuel cell stack 20 is constituted by stacked separators 21, 22, 23 and 24 of various types, and membrane electrode assemblies (N-MEA) 81 each sandwiched between a cathode-gas supply and diffusion layer (indicated by reference character C) and an anode-gas supply and diffusion layer (indicated by character A) of these separators.

The separators are of the following types:

A separator in which the cathode-gas supply and diffusion layer C is formed on one face of metal plate 30 and the anode-gas supply and diffusion layer A is formed on the other face of the metal plate 30; this will be referred to as separator 21 of type CA.

A separator in which the anode-gas supply and diffusion layer A is formed on only one face of the metal plate 30; this will be referred to as separator 22 of type A.

A separator in which the cathode-gas supply and diffusion layer C is formed on only one face of the metal plate 30; this will be referred to as separator 23 of type C.

A separator in which the anode-gas supply and diffusion layer A is formed on one face of the metal plate 30 and a coolant supply and diffusion layer W is formed on the other face of the metal plate 30; this will be referred to as separator 24 of type AW.

Figure 5:
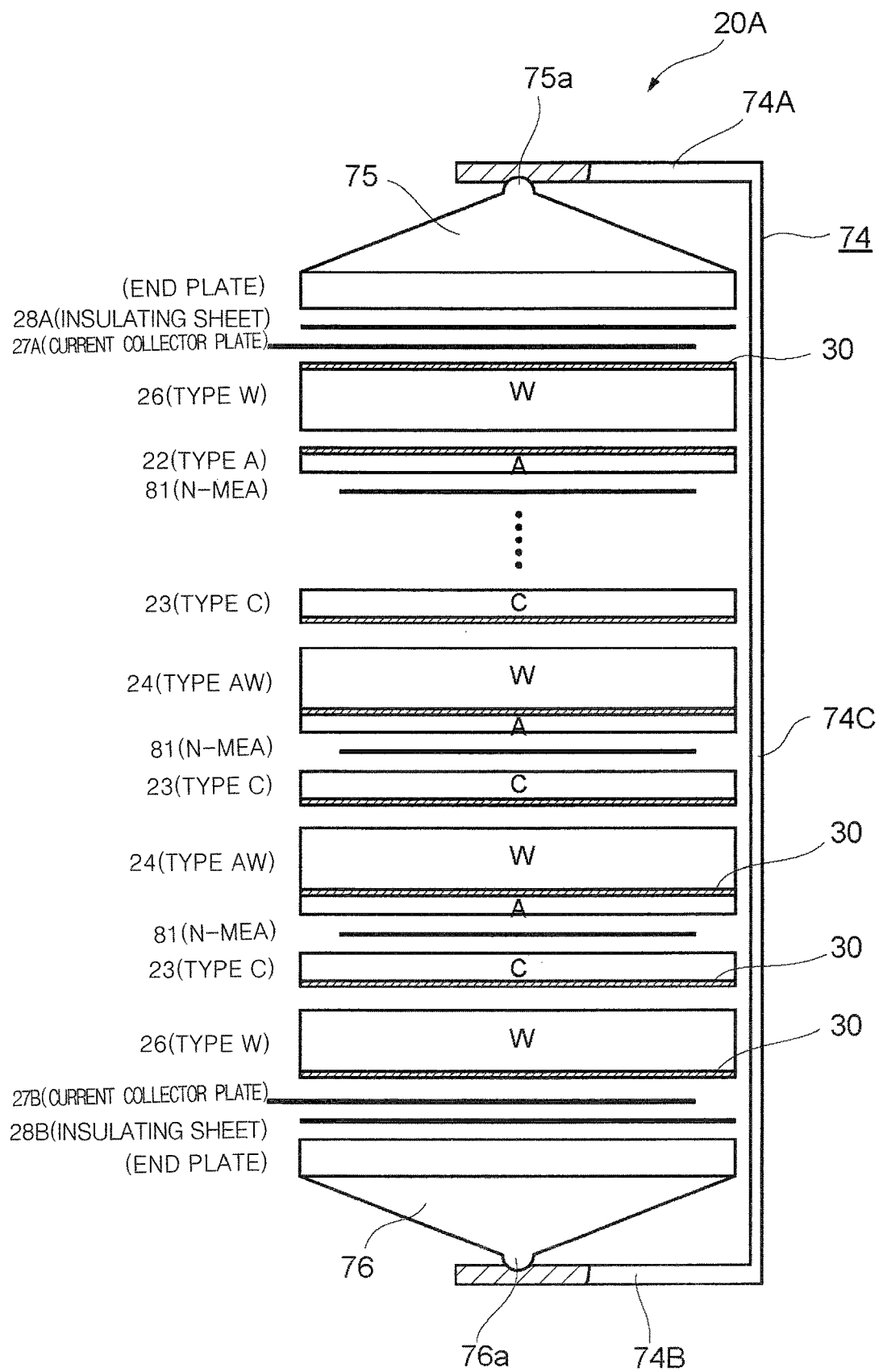
FIG. 5 is a view, seen from the front, conceptually illustrating a fuel cell stack according to another embodiment of the present invention.

Although not illustrated in FIGS. 1, 2 and 5, there is also a separator in which the cathode-gas supply and diffusion layer C is formed on one face of the metal plate 30 and the coolant supply and diffusion layer W is formed on the other face. This will be referred to as separator 25 of type CW.

There is also a separator in which the coolant supply and diffusion layer W is formed on one face of a metal plate. This will be referred to as separator 26 of type W (see FIG. 5). The coolant supply and diffusion layer W may by formed on both faces of the metal plate.

The details of construction of these separators will be described later.

Figure 35:
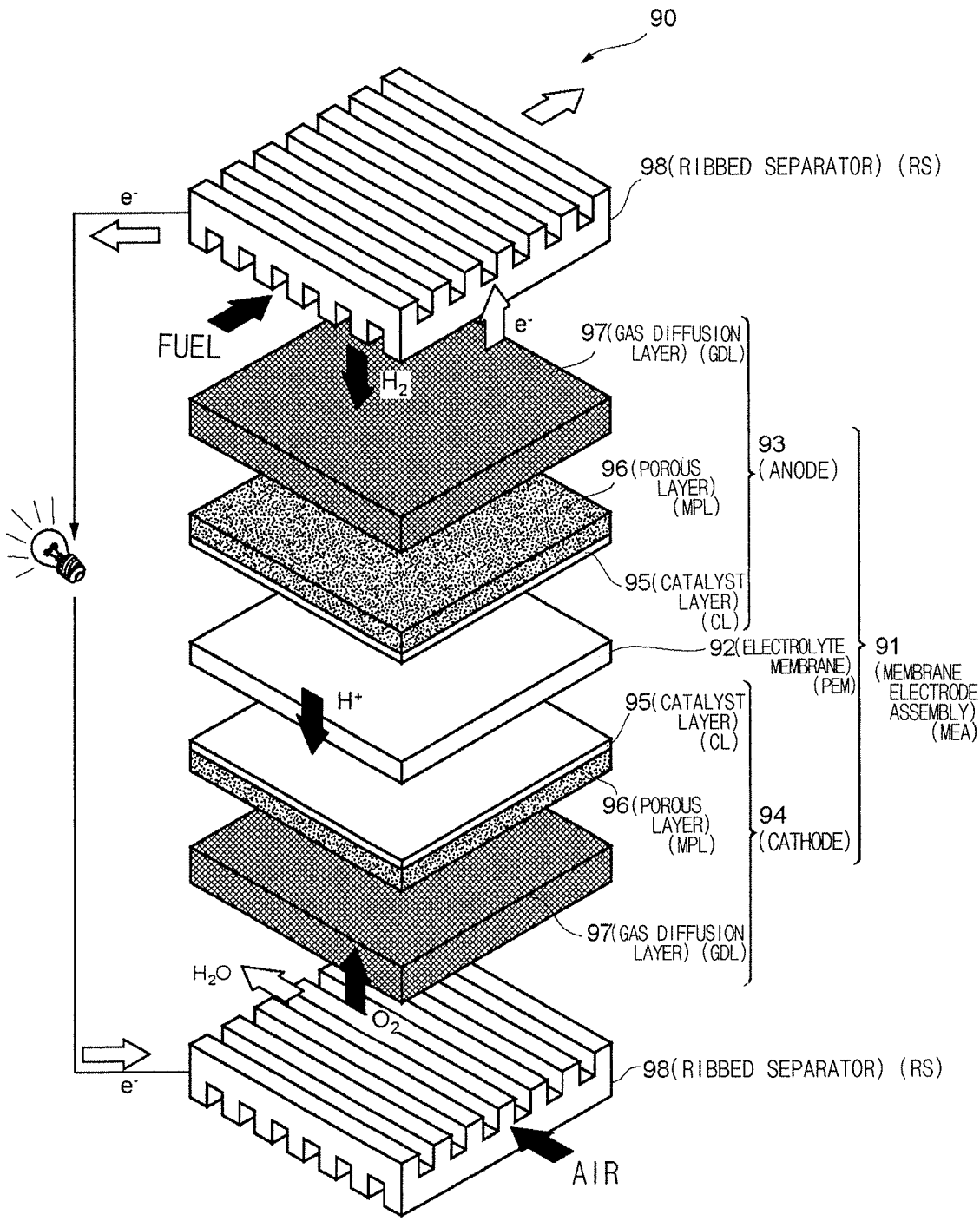
FIG. 35 is an exploded perspective view illustrating an example of the structure of a single cell constituting a fuel cell according to the prior art.

The membrane electrode assembly (N-MEA) 81 of this embodiment, unlike the conventional membrane electrode assembly 91 illustrated in FIG. 35, is constituted by an electrolyte membrane (PEM) 82, catalyst layers (CL) 85 in intimate contact with both sides thereof, and (micro) porous layers (MPL) 86 provided on the outer side of respective ones of the catalyst layers 85. This is a new type of membrane electrode assembly. In a case where the separator is provided with porous sheets 86A, as described later, corresponding to the porous layers 86, the porous layers 86 can be omitted from the membrane electrode assembly (N-MEA) 81.

As will be understood from FIGS. 1 and 2, the fuel cell stack 20 is such that the separators 21 to 24 of various types mentioned above construct single cells by being made to face each other with the membrane electrode assemblies (N-MEA) 81 being interposed between the cathode-gas supply and diffusion layer C and anode-gas supply and diffusion layer A of the separators. These single cells are arranged in such a manner that their cathode sides and anode sides alternate. The coolant supply and diffusion layer W is provided every other two single cells, and the separators 21 to 24 of various types are combined and stacked in such a manner that the metal plates 30 (preferably the metal plates 30 of type A or C) face the coolant supply and diffusion layers W. The current collector plates 27A, 27B are disposed at respective ones of both ends of the stack and are pressed from both sides by the end plates 75, 76 with the insulating sheets 28A, 28B being interposed between the respective end plates and the outer sides of the respective current collector plates. With regard to the separators situated at both ends of the stack and contacting the current collector plates 27A, 27B, it is preferred that they be arranged such that their metal plates 30 (corrosion-resistant layers) face outwardly.

Figure 3:
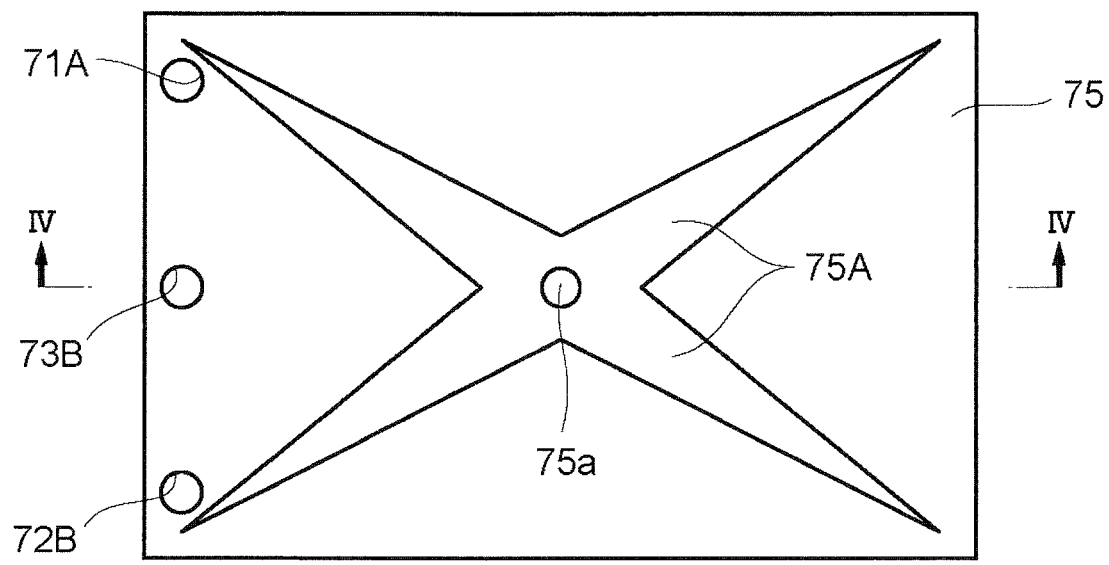
FIG. 3 is a plan view of an end plate.
Figure 4:
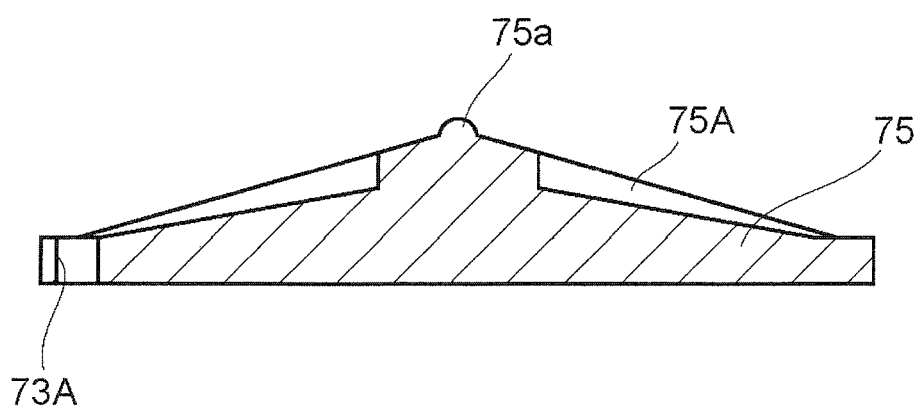
FIG. 4 is a sectional view taken along line IV-IV of FIG. 3.

The two end plates 75, 76 have such a structure that the above-mentioned separators and membrane electrode assemblies and the like can be pressed with uniform force within the planes thereof. More specifically, with regard to one end plate 75, as illustrated in FIGS. 3 and 4, the surface of the end plate 75 on the anode side is inclined in such a manner that overall thickness increases toward the central portion of the end plate, ribs 75A are formed radiating from the center toward the four corners, the ribs 75A are inclined in such a manner that the height thereof is maximum at the center of the end plate, and a pressure projection 75a is formed at the center of the end plate. The other end plate 76 on the cathode side has the same construction. The inner surface of each of the end plates 75, 76 is flat. Pressure projections 75a, 76a of the end plates 75, 76, respectively, are pressed inwardly from the outside by a clamping spring support 74, whereby a uniform force acts in the plane of each separator, etc. The clamping spring support 74 is equipped with a support portion 74C and spring portions 74A, 74B extending at right angles from both ends of the support portion 74C. The spring portions 74A, 74B are formed to have recesses into which fit the projections 75a, 76a, respectively.

One end portion of the end plate 75 on the anode side has an anode-gas inlet 71A, a cathode-gas outlet 72B and a coolant outlet 73B. One end of the other end plate 76 on the cathode side (the end on the side opposite the above-mentioned end of the end plate 75 on the anode side) has an anode-gas outlet 71B, a cathode-gas inlet 72A and a coolant inlet 73A (these are indicated collectively by broken lines in FIG. 2). Connected to these inlets and outlets (discharge ports) are supply pipes (tubes) and discharge pipes (tubes) for the corresponding fluids.

FIG. 5 illustrates another example of a fuel cell stack. Components in FIG. 5 identical with those shown in FIGS. 1 and 2 are designated by like reference characters and need not be describe again.

In a fuel cell stack 20A shown in FIG. 5, the coolant supply and diffusion layer W is provided for every other single cell, which includes the cathode-gas supply and diffusion layer C, the anode-gas supply and diffusion layer A and the membrane electrode assembly (N-MEA) sandwiched between them, and the coolant supply and diffusion layer W is placed also at positions at both ends of the stack 20A. By thus disposing many of the coolant supply and diffusion layers W, the structure obtained is such that temperature control can be carried out stably and quickly (warm water can be supplied to the coolant supply and diffusion layers W in a case where the stack is started up in cold climates).

Separator of Type CA

Figure 6:
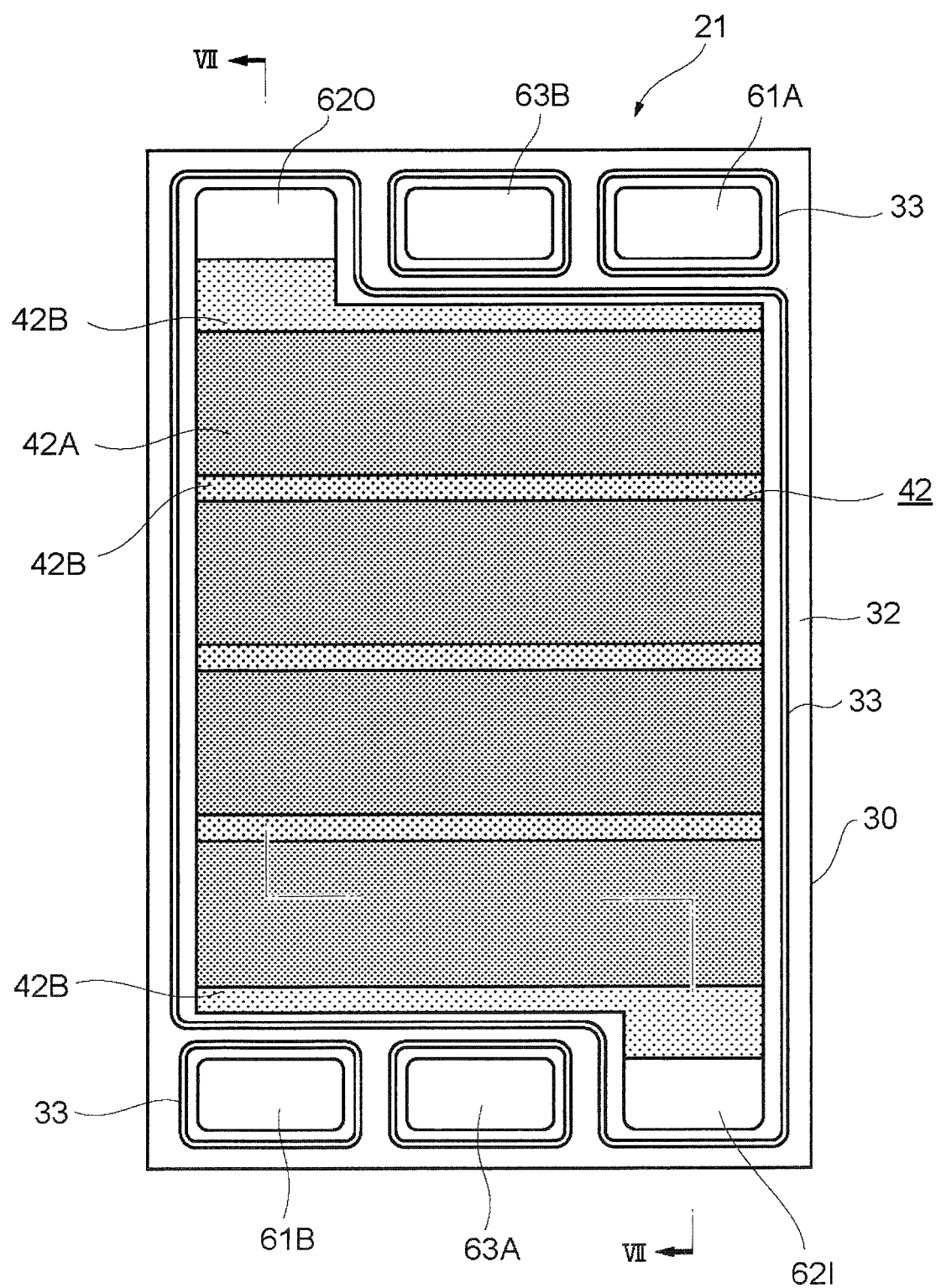
FIG. 6 is a plan view of a separator of type CA.
Figure 7:
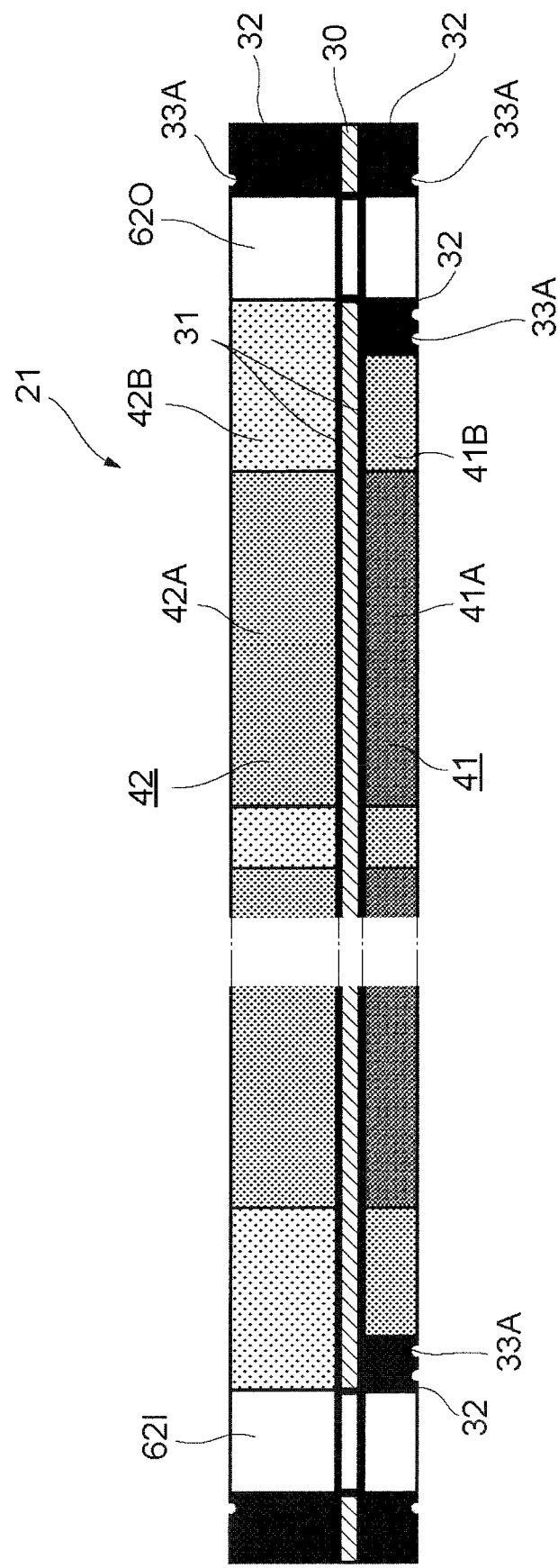
FIG. 7 is an enlarged sectional view taken along line VII-VII of FIG. 6.
Figure 8:
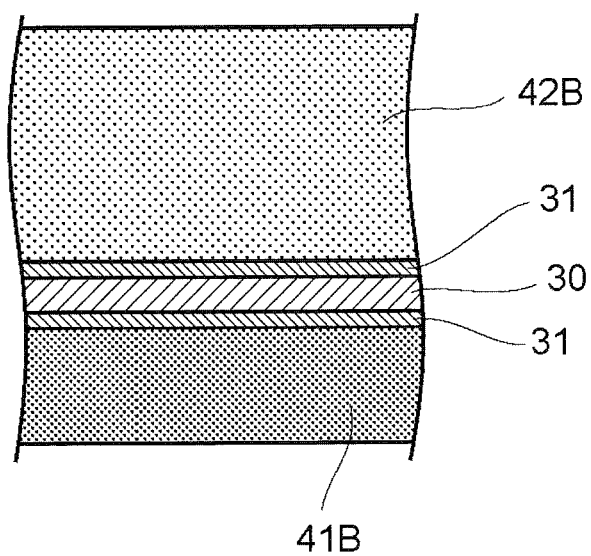
FIG. 8 is a sectional view illustrating a portion of FIG. 7 in further enlargement.

The separator 21 of type CA is illustrated in FIGS. 6, 7 and 8. The separator 21 has an anode-side fluid (gas) (fuel, specifically a gas that includes mainly hydrogen $H_2$) supply and diffusion layer (hydrogen supply and diffusion layer) 41 formed on one face of the rectangular flat metal plate (metal sheet) (metal plate) 30 serving as a substrate, and a cathode-side fluid (gas) (air or oxygen $O_2$) supply and diffusion layer 42 formed on the other face of the metal plate.

Figure 9:
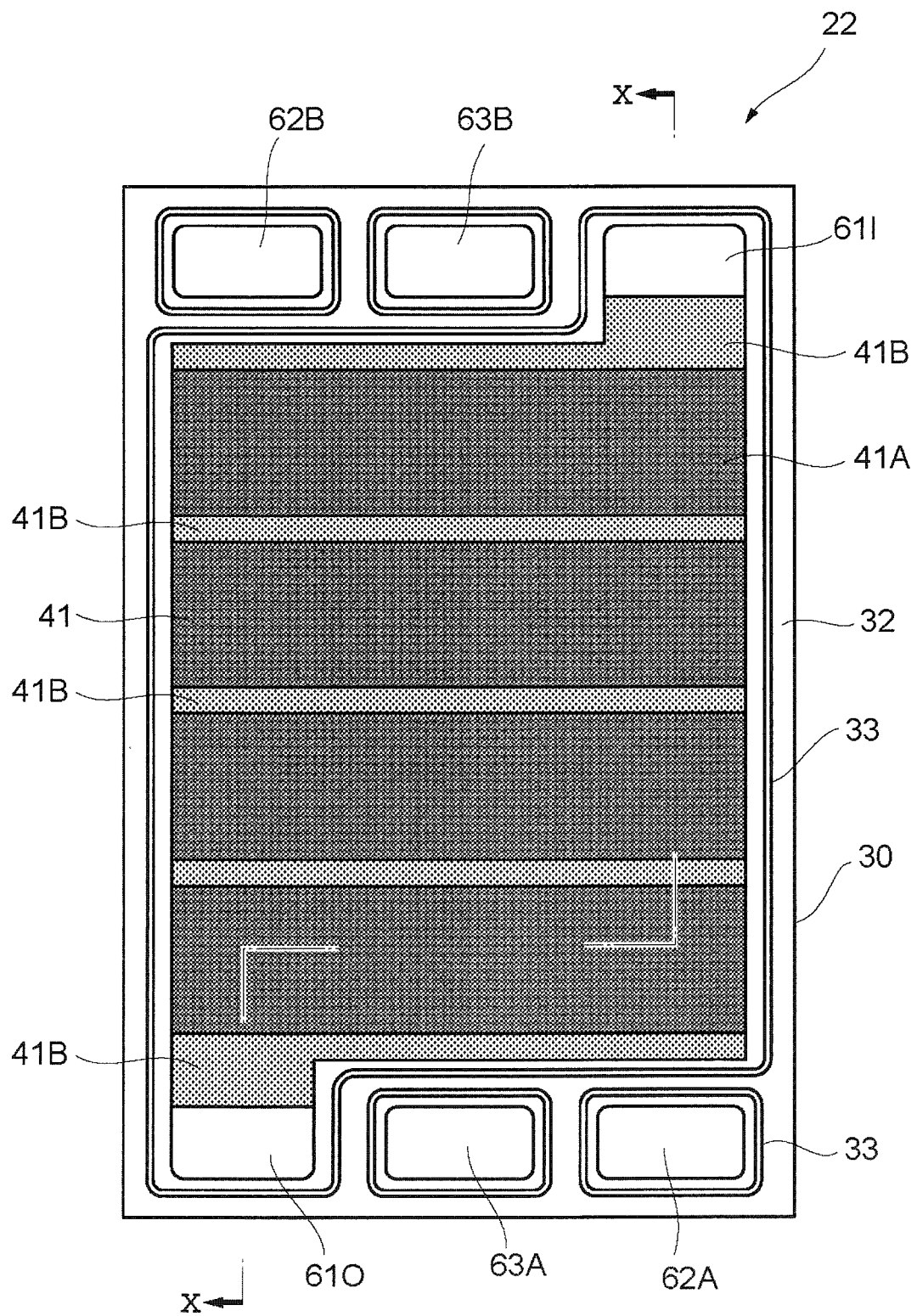
FIG. 9 is a plan view of a separator of type A.

More specifically, one end portion of the metal plate 30 in terms of the longitudinal direction thereof is provided with a transversely arrayed (right, left and center in FIG. 6 in the order mentioned) anode-gas supply (inlet) hole 61A, cathode-gas (and product water) discharge hole 62B [for example, see FIG. 9; in FIG. 6, the hole is an oxygen (and product water) outlet 62O] and coolant discharge hole 63B. Likewise, the other end portion is provided with an anode-gas discharge hole 61B, a cathode-gas supply (inlet) hole 62A (for example, see FIG. 9; in FIG. 6, the hole is an oxygen inlet 62I) and a coolant supply (inlet) hole 63A. With the exception of the these supply holes and discharge holes in the metal plate 30, substantially the entire central portion of the plate is a region in which a fluid supply and diffusion layer is formed. The periphery of these supply holes, discharge holes and region forming the fluid supply and diffusion layer is surrounded by a dense frame 32. The dense frame 32 prevents leakage of the fluids. A groove 33A is formed in the outer surface of the dense frame 32 along the frame 32 so as to surround the supply holes, discharge holes and region forming the fluid supply and diffusion layer, and the groove is provided with a gasket (a sealing member such as packing or an O-ring) 33. A corrosion-resistant layer (corrosion-resistant coating) 31 is formed on both faces of the metal plate 30 over the entire surface thereof with the exception of the portions where the supply holes and discharge holes are located (see FIG. 8). Preferably, a corrosion-resistant layer is formed also on the inner peripheral surface of each supply (inlet) hole and discharge hole. If necessary, a corrosion-resistant layer is formed also on the side faces and end faces of the metal plate 30. The corrosion-resistant layer 31 is a sealing layer like the dense frame 32 and prevents corrosion of the metal plate 30. The gasket 33 comes into intimate contact with another joined separator, the membrane electrode assembly (N-MEA) 81 or the current collector plates 27A, 27B, thereby preventing fluid leakage.

The cathode-side structure illustrated in FIG. 6 will now be described. The oxygen (cathode gas) supply hole 62A serves as the oxygen (cathode gas) inlet 62I and the oxygen discharge hole 62B serves as the oxygen outlet 62O and connect with the region in which the fluid supply and diffusion layer 42 is formed. In the region in which the fluid supply and diffusion layer is formed, the fluid supply and diffusion layer 42 is formed over the entire surface thereof inside the dense frame 32 to a height (thickness) identical with that of the dense frame 32. On the fluid supply and diffusion layer 42 there are provided, as a part thereof, mutually spaced-apart (gas-pressure) equalization layers 42B, which extend in the transverse direction of the longitudinally long metal plate 30, in a partial region in contact with the oxygen inlet 62I, a partial region in contact with the oxygen outlet 62O and in several partial regions between these partial regions, the equalization layers 42B being provided transversely across the entirety of the fluid supply and diffusion layer 42. The equalization layers 42B intersect a direction from the oxygen inlet 62I (fluid supply side) to the oxygen outlet 62O (fluid discharge side). Portions of the fluid supply and diffusion layer other than where the equalization layers 42B are located are indicated at 42A. The equalization layers 42B also constitute portions of the fluid supply and diffusion layer 42. In this embodiment, the equalization layers 42B and the diffusion layers 42A other than equalization layers are alternately provided in a direction from the oxygen inlet 62I to the oxygen outlet 62O.

Figure 34:
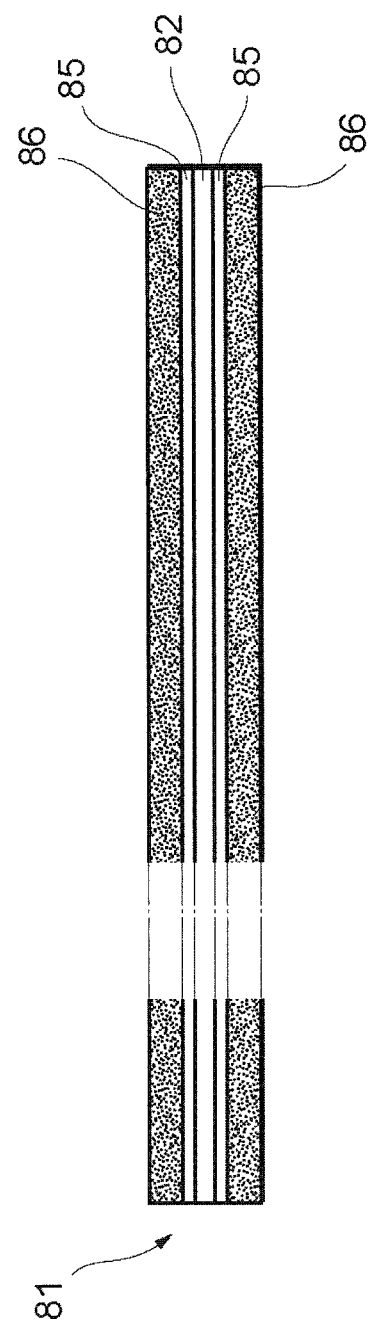
FIG. 34 is a sectional view illustrating a new type of membrane electrode assembly according to an embodiment of the present invention.

The fluid supply and diffusion layer 42 (and the equalization layer 42B as well) is an electrically conductive (micro) porous layer. The equalization layer 42B has a fluid resistance smaller than that of the remaining regions 42A. Accordingly, oxygen gas suitably pressurized and supplied from the oxygen inlet 62I first is diffused substantially uniformly over the entire width of the separator 21 within the low-fluid-resistance equalization layer 42B (the region in contact with the oxygen inlet 62I). The oxygen gas then diffuses in the direction from the oxygen inlet 62I to the oxygen outlet 62O within the fluid supply and diffusion layers 42 (portions 42A that are other than the equalization layers 42B). The oxygen diffuses also in the width direction within each equalization layer 42B of low fluid resistance so that the gas pressure is equalized. While being diffused within the fluid supply and diffusion layers 42, the oxygen is supplied to the membrane electrode assembly 81 (see FIG. 34) provided in contact with the fluid supply and diffusion layers 42 and contributes to the power generating reaction. Residual oxygen and water that has been produced are discharged in the direction of the oxygen outlet 62O.

Since the fluid supply and diffusion layer 42 (42A, 42B) is provided substantially over the entire surface of the separator 21 (with the exception of the portions where the various fluid supply and discharge holes are provided), the major portion of the region of separator 21 contributes to the power generating reaction and can be utilized as an effective reaction region to the fullest extent. Further, since the fluid supply and diffusion layer 42 (42A, 42B) (as well as the dense frame 32) is formed substantially over the entire surface of the separator 21 and no recesses or other spaces exist, mechanical strength is enhanced along the stack direction of the cell stack so that the clamping force produced by the clamping spring support 74 can be fully supported.

The fluid supply and diffusion layer has a construction that includes a mixture of an electrically conductive material (preferably a carbon-based electrically conductive material) and a polymer resin. Mixing the carbon-based electrically conductive material with the polymer resin enables the polymer resin to be imparted with a high conductivity and makes it possible to enhance the corrosion resistance of the polymer resin. The fluid resistance (porosity, discussed later) of the fluid supply and diffusion layer can be adjusted (controlled) by adjusting the percentage of the carbon-based conductive-material content. In particular, mixing in a large quantity of carbon fiber lowers fluid resistance (enlarges porosity). Conversely, fluid resistance can be raised (porosity reduced) by increasing the percentage of polymer-resin content. By raising its percentage of carbon-based conductive-material content and adding carbon fiber, the fluid resistance of the equalization layers 42B is reduced below (porosity is raised above) that of the other portions 42A of the fluid supply and diffusion layer 42. Preferably, the corrosion-resistant layer 31 and frame 32 also are each a mixture of an electrically conductive material and polymer resin, whereby the percentage of polymer-resin content is raised to heighten density while conductivity is assured.

Such materials as graphite, carbon black, diamond-coated carbon black, silicon carbide, titanium carbide, carbon fibers and carbon nanotubes can be used as the carbon-based conductive material.

Both a thermosetting resin and a thermoplastic resin can be used as the polymer resin. Examples of the polymer resin are resins such as phenol resin, epoxy resin, melamine resin, rubber-based resin, furan resin and polyvinylidine fluoride resin.

Preferably the metal plate 30 is a metal comprising one or more among Inconel, nickel, gold, silver or platinum, or an austenitic steel plate plated or clad with metal. Corrosion resistance can be improved by using these metals.

The fluid supply and diffusion layer 41 for hydrogen gas (anode gas) is formed on the other face (the face on the anode side) of the separator 21 of type CA (see FIG. 7). The pattern of the fluid supply and diffusion layer 41 basically is the same as that of the pattern of the anode-side fluid supply and diffusion layer 42 shown in FIG. 6 with the exception of the points below. Specifically, the pattern differs in that: the region of the fluid supply and diffusion layer 41 connects with the hydrogen supply hole 61A (hydrogen inlet 61I) and hydrogen discharge hole 61B (hydrogen outlet 61O) (see FIG. 9) (there is no connection with the oxygen inlet 62I and oxygen outlet 62O); the fluid resistance of an anode-gas (hydrogen-gas) pressure equalization layer 41B may be greater than the fluid resistance of the oxygen-gas pressure equalization layer 42B; the fluid resistance of the other portion 41A of the fluid supply and diffusion layer may be greater than the portion 42A of the cathode-gas (oxygen-gas) fluid supply and diffusion layer; and the thickness of the fluid supply and diffusion layer 41 may be less than the thickness of the oxygen-gas fluid supply and diffusion layer 42. These differences are based upon the fact that the flow rate and viscosity of the passing anode gas (hydrogen fuel) are small in comparison with those of the cathode gas. The equalization layer 41B is disposed so as to intersect the direction from the hydrogen inlet 61I to the hydrogen outlet 61O as a matter of course.

Separator of Type A

Figure 10:
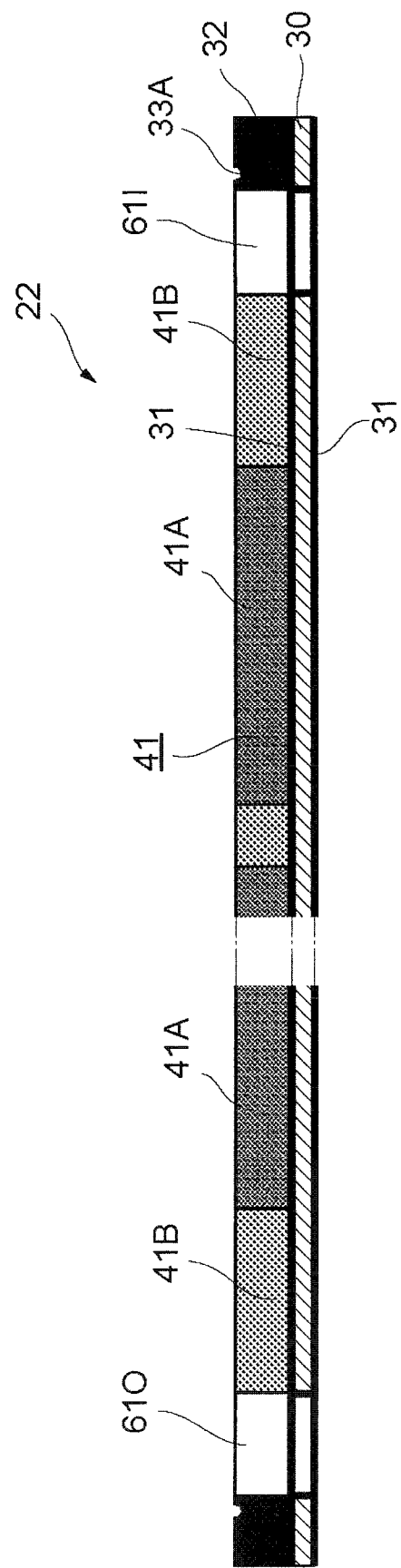
FIG. 10 is an enlarged sectional view taken along line X-X of FIG. 9.

The separator 22 of type A is illustrated in FIGS. 9 and 10.

The fluid supply and diffusion layer 41, which includes the anode-side equalization layer 41B, is formed only on one face of the metal plate 30. The other face of the metal plate 30 is coated with the corrosion-resistant layer 31. Such a separator is suitable for being placed as the uppermost or lowermost layer of the fuel cell stack and at a position where contact is made with a separator (of type AW or CW) having a fluid supply and diffusion layer 42 for coolant or with a coolant-dedicated separator (of type W). The same holds true with regard to the separator 23 of type C described next.

Separator of Type C

Figure 11:
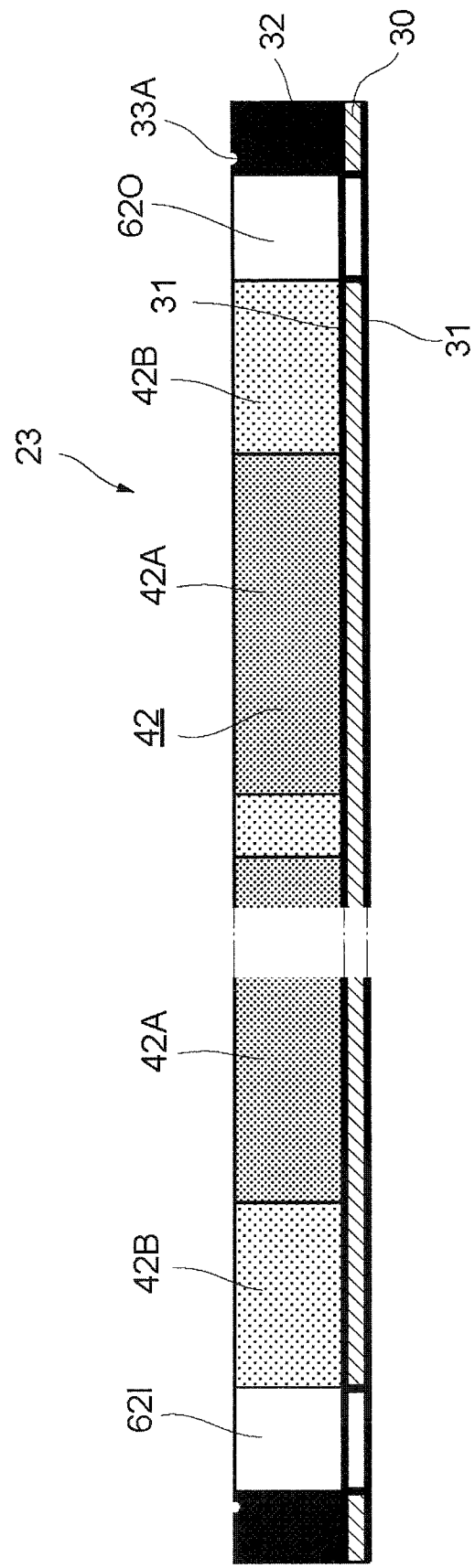
FIG. 11 is an enlarged sectional view, which corresponds to FIG. 10, illustrating a separator of type C.

The cross section of the separator 23 of type C, which corresponds to FIG. 7, is illustrated in FIG. 11. In the separator 23 of type C as well, the fluid supply and diffusion layer 42, which includes the cathode-side equalization layer 42B, is formed only on one face of the metal plate 30, and just the corrosion-resistant layer 31 is formed on the other face.

Separator of Type AW

Figure 12:
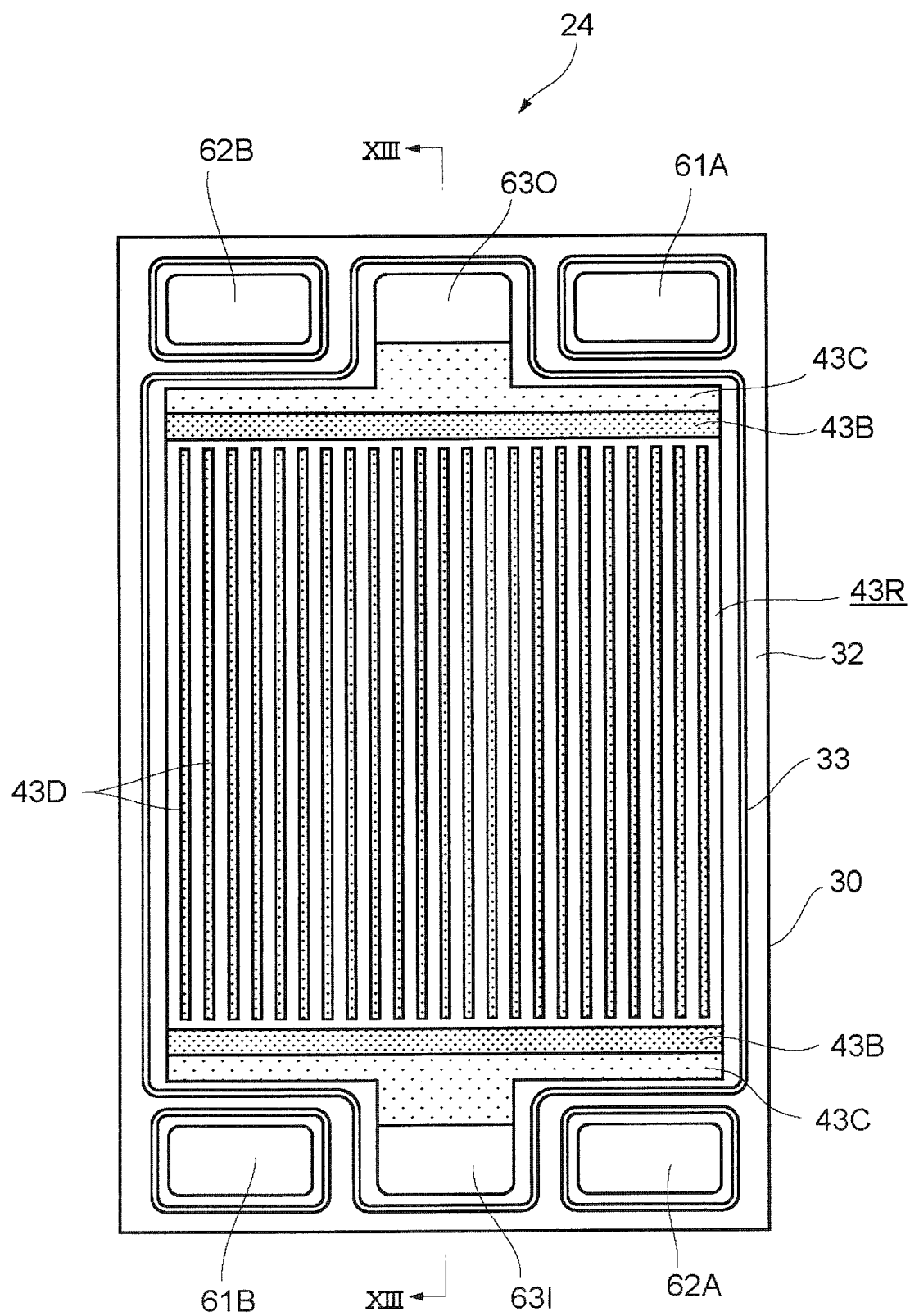
FIG. 12 is a plan view of a separator of type AW.
Figure 13:
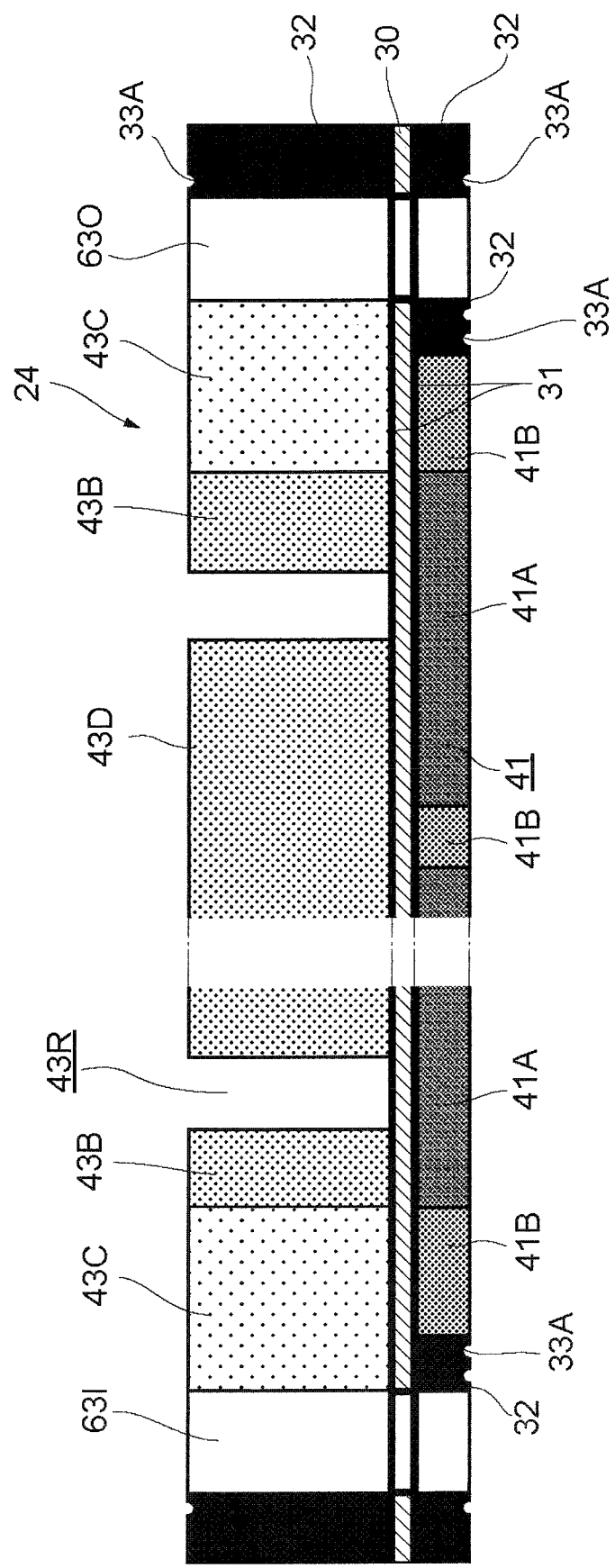
FIG. 13 is an enlarged sectional view taken along line XIII-XIII of FIG. 12.

The separator of type AW is illustrated in FIGS. 12 and 13. In the separator 24, a fluid supply and diffusion layer region 43R for a coolant is formed on one face of the metal plate 30, and the fluid supply and diffusion layer 41 (already described), which includes the anode-gas equalization layer 41B, is formed on the other face. The construction of the fluid supply and diffusion layer region 43R for coolant will now be described.

The fluid supply and diffusion layer region 43R connects with the coolant supply hole 63A (coolant inlet 63I) and coolant discharge hole 63B (coolant outlet 63O). Water-flow equalization layers 43B are provided slightly spaced away from (close to) respective ones of the coolant inlet 63I and coolant outlet 63O. Specifically, fluid supply and diffusion layers 43C each comprising a (micro) porous material are provided in contact with respective ones of the coolant inlet 63I and outlet 63O, and the equalization layers 43B are provided inwardly of and adjacent to the fluid supply and diffusion layers 43C. The equalization layers 43B are formed on the fluid supply and diffusion layer region 43R across the full width thereof so as to intersect the direction from the coolant inlet 63I to the coolant outlet 63O. A number of ribs 43D forming coolant flow paths are provided in the centrally located wide space between the two equalization layers 43B. The ribs 43D extend linearly along the flow direction with a spacing between them defining flow paths. The ribs 43D also are formed by a (micro) porous material. Accordingly, the coolant passes in between the ribs 43D so that a cooling effect is obtained at the portions of the ribs 43D as well.

The fluid resistance of the fluid supply and diffusion layers 43C formed by the porous layer, which layers are provided in contact with the coolant inlet 63I and coolant outlet 63O for the purpose of supplying and diffusing water, is set to be fairly small in comparison with the above-mentioned cathode-gas and anode-gas supply and diffusion layers. The fluid resistance of the equalization layers 43B is larger than that of the fluid supply and diffusion layers 43C. The reason for this is that since water has a higher viscosity than gas, it is arranged so that coolant that has entered the diffusion layer 43C from the coolant inlet 63I is sufficiently diffused by the portion 43C, which has the low fluid resistance, and so that progress of the coolant in the direction of the coolant outlet 63O is blocked by the next equalization layer 43B, as a result of which the coolant spreads sufficiently over the entirety of the width of the separator 24. With regard to porous material constituting the ribs 43D, it will suffice if the coolant can pass through. In order to lower the coolant circulation resistance, it is preferred that the thickness of the fluid supply and diffusion layer 43C, equalization layer 43B and ribs 43D be greater than the thickness of the cathode-gas supply and diffusion layer 42 and anode-gas supply and diffusion layer 41.

With regard to the supply and diffusion layer for coolant, the layer, inclusive of all layers 43B, 43C, ribs 43D, corrosion-resistant layers 31 and dense frame 32, need not necessarily be imparted with electrical conductivity. Naturally, if a carbon-based material is used to form the porous layer, porous ribs, dense frame 32 and corrosion-resistant layers, these will be imparted with electrical conductivity. As a result, when the cells are stacked, the cathodes and anodes can be electrically connected and hence electrical conductivity should be imparted to the separator for the coolant as well.

Figure 14:
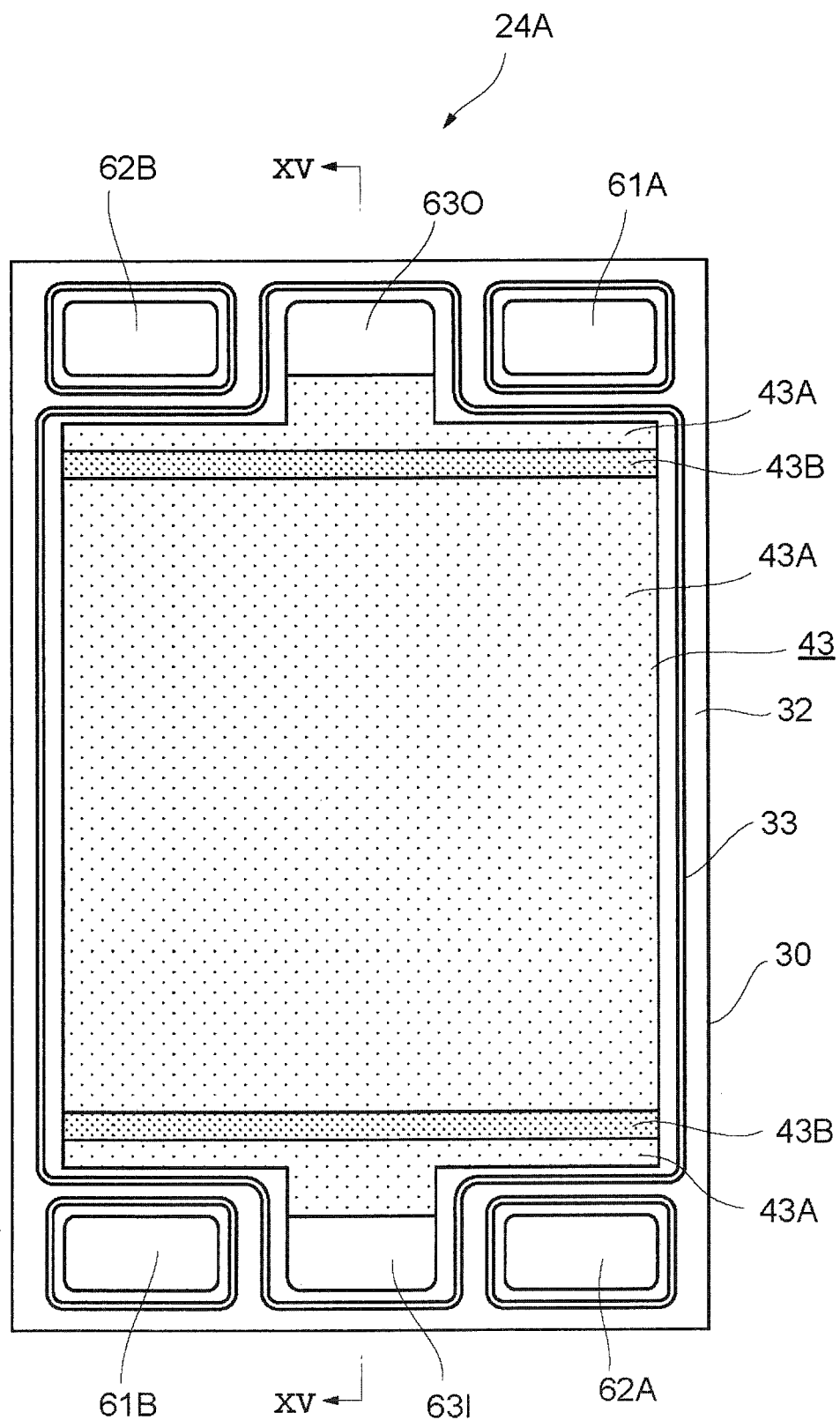
FIG. 14 is a plan view illustrating a modification of the separator of type AW.
Figure 15:
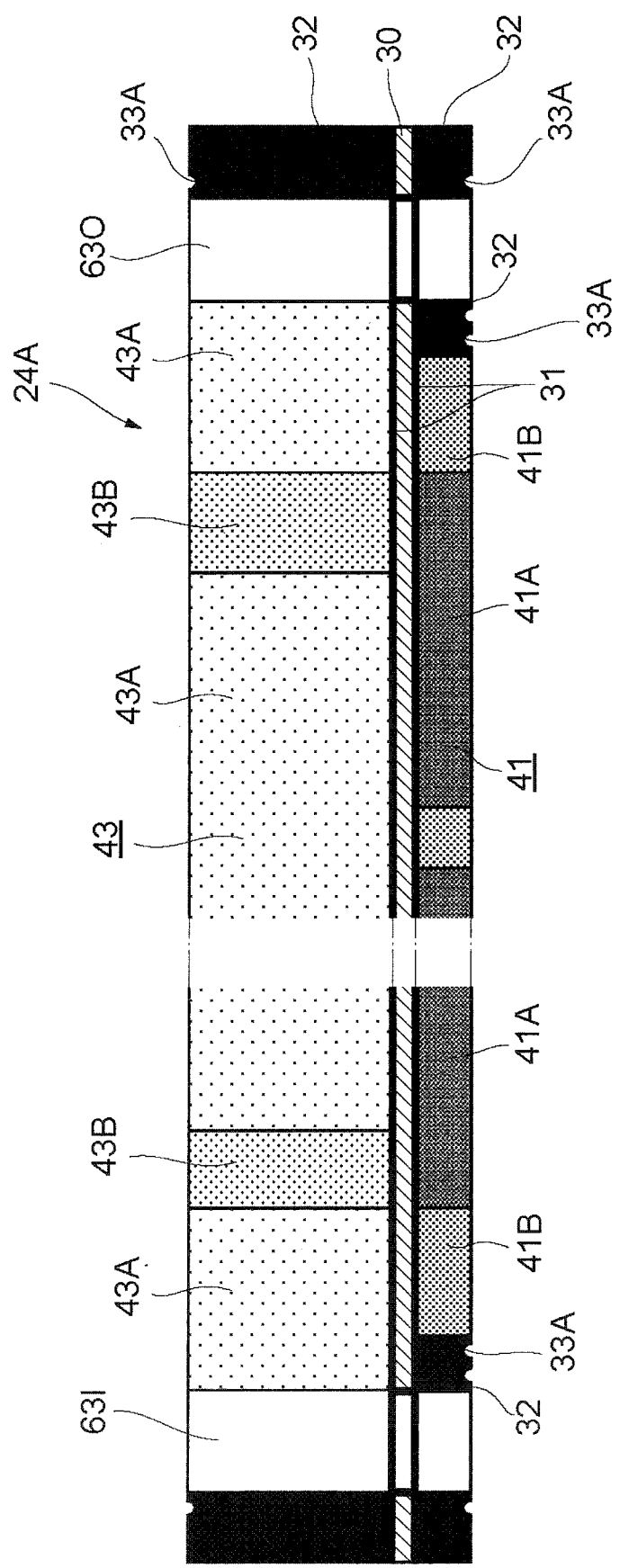
FIG. 15 is an enlarged sectional view taken along line XV-XV of FIG. 14.

FIGS. 14 and 15 illustrate another example of a separator of type AW. The differences between this separator and that shown in FIGS. 12 and 13 will now be described.

In separator 24A of type AW of FIGS. 14 and 15, the fluid supply and diffusion layer 43 for coolant is formed on one face of the flat metal plate 30 and the anode-side hydrogen supply and diffusion layer 41 is formed on the other face.

The region in which the fluid supply and diffusion layer 43 is formed connects with the coolant supply hole 63A (coolant inlet 63I) and coolant discharge hole 63B (coolant outlet 63O). The water-flow equalization layers 43B are provided slightly spaced away from (close to) respective ones of the coolant inlet 63I and coolant outlet 63O. Portions 43A of the fluid supply and diffusion layer 43 other than the equalization layers 43B are provided in contact with respective ones of the coolant inlet 63I and outlet 63O, and a portion 43A is provided at a location of large area between the two equalization layers 43B. In order to supply and diffuse the water, the fluid resistance of the fluid supply and diffusion layer 43 formed by a (micro) porous layer is set to be fairly small in comparison with the above-mentioned fluid supply and diffusion layers for hydrogen or oxygen on the anode and cathode sides. The fluid resistance of the equalization layers 43B is larger than that of the remaining portions 43A.

Separator of Type CW

Figure 16:
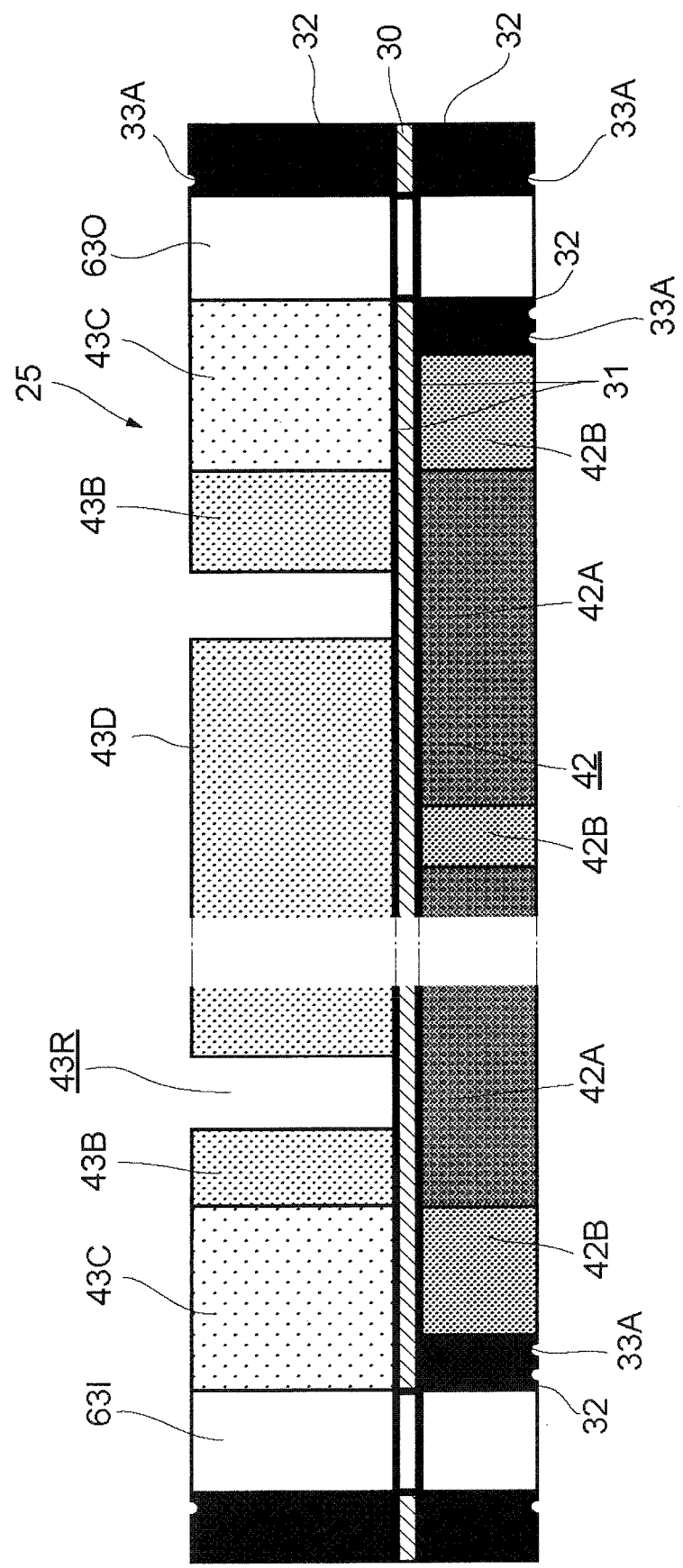
FIG. 16 is an enlarged sectional view, which corresponds to FIG. 13, illustrating a separator of type CW.

In the above-described separators 24, 24A of type AW, the fluid supply and diffusion layer region 43R or fluid supply and diffusion layer 43 for a coolant is formed on one face of the metal plate, and the anode-side fluid supply and diffusion layer 41 for hydrogen gas is formed on the other face. As illustrated in FIG. 16, it is possible to fabricate a separator 25 in which the fluid supply and diffusion layer region 43R or fluid supply and diffusion layer 43, which includes the water-flow equalization layer 43B for coolant, is formed on one face of the metal plate and the fluid supply and diffusion layer 42, which includes the cathode-side equalization layer 42B for oxygen gas (and product water), is formed on the other face. This separator is a separator of type CW.

Separator of Type W

Figure 17:
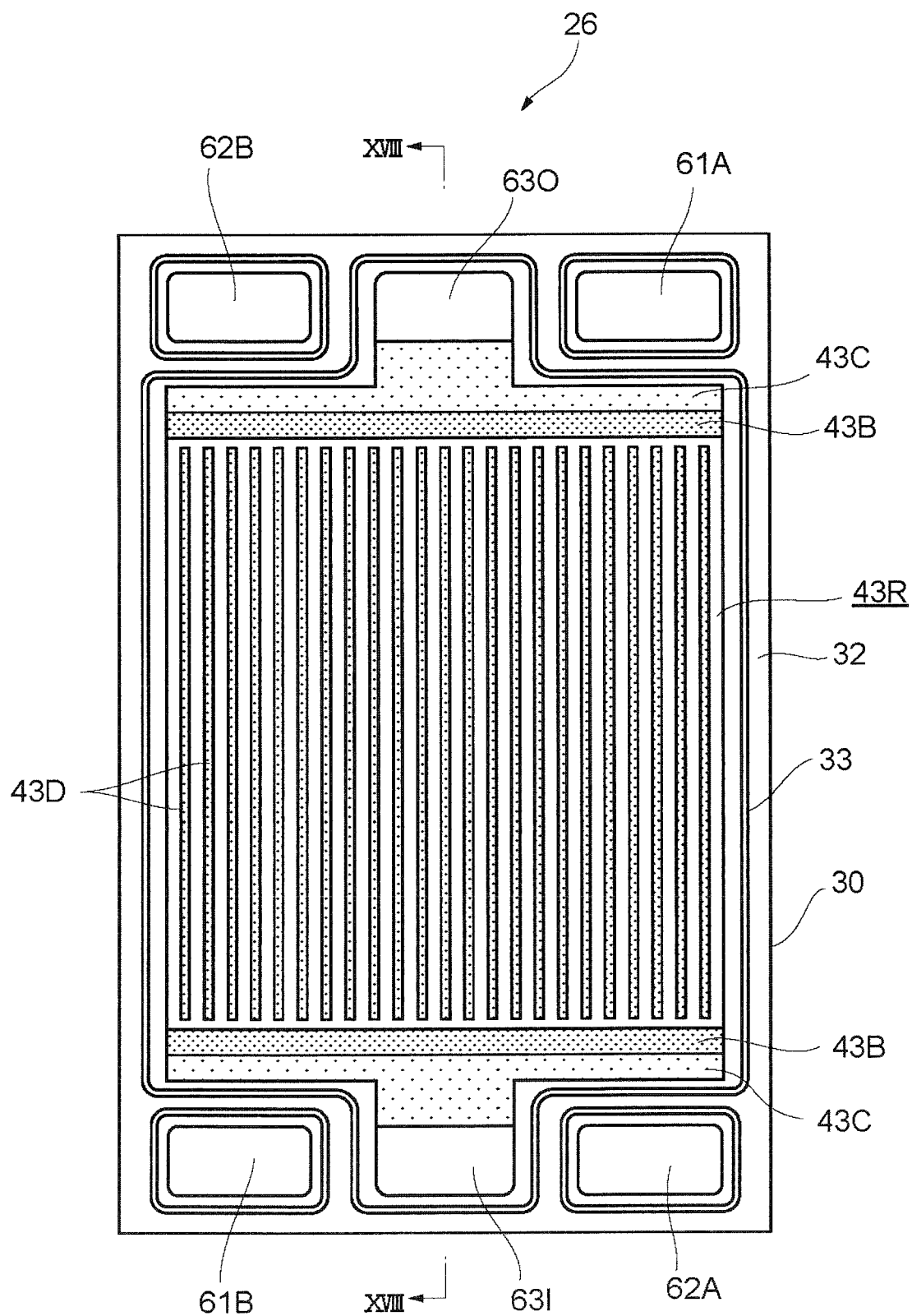
FIG. 17 is a plan view of a separator of type W.
Figure 18:
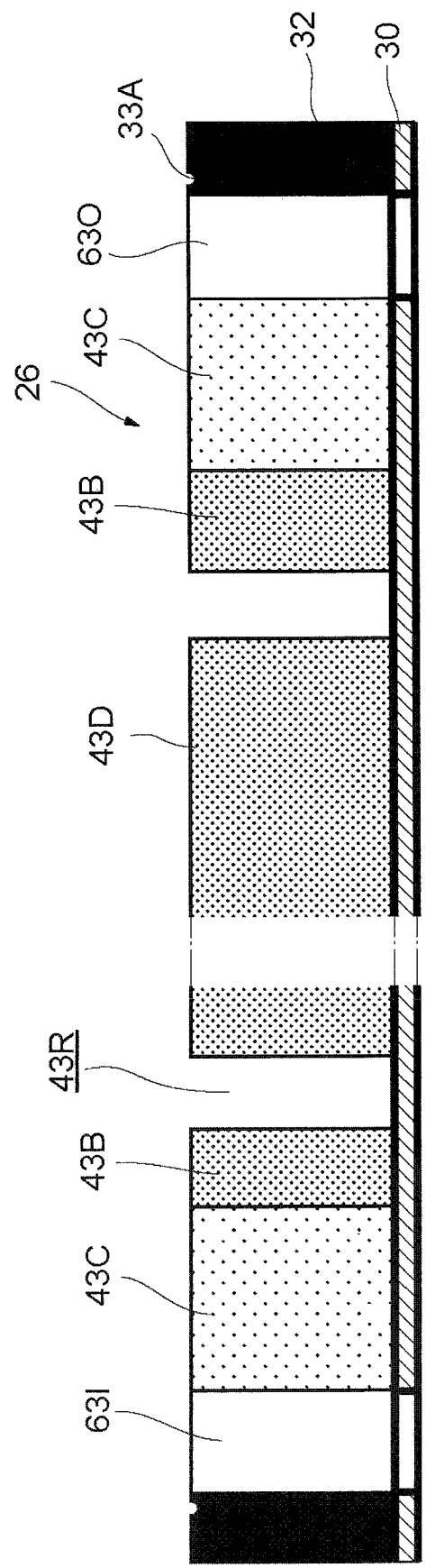
FIG. 18 is an enlarged sectional view taken along line XVIII-XVIII of FIG. 17.

A separator in which a fluid supply and diffusion layer region or fluid supply and diffusion layer, which includes a water-flow equalization layer for coolant, is formed on one face of a metal plate and only a corrosion-resistant layer is formed on the other face is referred to as the separator of type W. An example of a separator of type W is illustrated as separator 26 in FIGS. 17 and 18. The fluid supply and diffusion layer region 43R that includes the equalization layer 43B for coolant identical with that shown in FIGS. 12 and 13 is formed on one face of the flat metal plate 30. The fluid supply and diffusion layer 43 that includes the equalization layer 43B for coolant identical with that shown in FIGS. 14 and 15 may be formed on one face of the metal plate 30. A fluid supply and diffusion region or fluid supply and diffusion layer for coolant may be formed on both faces of the metal plate.

Separator Manufacture, Etc.

Preferably, the corrosion-resistant layer, dense frame, fluid supply and diffusion layer (inclusive of the equalization layer) and ribs, etc., are formed by isotropic pressurization. For example, in the case of a thermosetting resin (or thermoplastic resin, as mentioned above), a carbon-based conductive powder (an carbon fiber if necessary), a resin powder and volatile solvent are kneaded together to form a paste. A number of types of pastes are prepared for the corrosion-resistant layer and dense frame, for the equalization layer of the fluid supply and diffusion layer, for portions of the fluid supply and diffusion layer other than the equalization layer and for the ribs. Patterns of the corrosion-resistant layer and dense frame, a pattern of the equalization layer of the fluid supply and diffusion layer, patterns for the remaining portions thereof and, if necessary, the pattern of the ribs are formed successively by printing, stamping or squeezing. The solvent is volatized whenever each pattern is formed. The entire flat metal plate on which all of the above-mentioned patterns have been formed is placed inside a soft, thin rubber bag, the bag is deaerated to vacuum, then the rubber bag is placed inside a pressure-proof vessel, a heated fluid is introduced into the vessel and the resin is cured by the pressurized and heated fluid and by application of isotropic pressure. In order to achieve an identical height (thickness) for the dense frame, fluid supply and diffusion layer and ribs, etc., it is preferred that the height (thickness) of these layers and ribs be adjusted, at the time of pattern fabrication, in accordance with the extent of shrinkage that occurs when the resin cures.

On one hand, a corrosion-resistant layer can be formed on a flat metal plate. On the other hand, a fluid supply and diffusion layer (one type of sheet) that includes a dense frame and an equalization layer can be formed and these can be thermally contact-bonded with pressure subsequently. At this time the dense frame may be fabricated at the same time as the corrosion-resistant layer on the flat metal plate. It can be arranged so that the corrosion-resistant layer and dense frame are fabricated on the flat metal plate in a first stage and, in a second stage thereafter, the pastes of the equalization layer and fluid supply and diffusion layer are printed successively on the corrosion-resistant layer of the metal plate and then dried, after which curing is performed using a roll press (hot press).

An example will be described in which the pastes of the gas supply and diffusion layer and of the equalization layer are fabricated by a carbon-based conductive material and thermosetting resin. In a case where 85 wt % (percent by weight) of carbon-based conductive material [in which the ratio of carbon black is 0.5 and that of carbon fiber (the length of which is approximately 20 μ) is 9.5] was kneaded together with 15 wt % of epoxy resin, the porosity (described below) of the gas supply and distribution layer that could be obtained after pressure molding was about 60%. Further, 50% was obtained as the porosity of the equalization layer acquired by kneading together 80 wt % of carbon-based conductive material (in which the ratio of carbon black is 1.0 and that of carbon fiber is 9.0) and 20 wt % of epoxy resin.

In particular, the fluid resistance of the fluid supply and diffusion layer (with the exception of the equalization layer) and the fluid resistance of the equalization layer depend upon the porosity of the porous layer and the area [height (thickness) and width of each layer] of the surface perpendicular to the direction of fluid flow. If the porosity increases, the fluid resistance decreases. If the area over which the fluid flows increases, the fluid resistance decreases (fluid resistance per unit area is constant). In terms of a rough guideline, the porosity of the fluid supply and diffusion layer (with the exception of the equalization layer) is 30 to 85% with regard to the anode-gas fluid supply and diffusion layer, 50 to 85% with regard to the cathode gas, and 70 to 100% with regard to the coolant (100% in the case of the flow-path space ascribable to the ribs). Further, with regard to the porosity of the equalization layer, the porosity is 40 to 90% in the case of the anode gas, 55 to 90% in the case of the cathode gas, and 50 to 80% in the case of the coolant. Porosity P is defined by P=(volume of pores in the porous body)/(volume of the porous body), which is readily measured. Here the pores are true pores that include pores that do not lead to the outside.

Modifications

FIGS. 19 to 22 illustrate a modification of the separator of type C.

Figure 19:
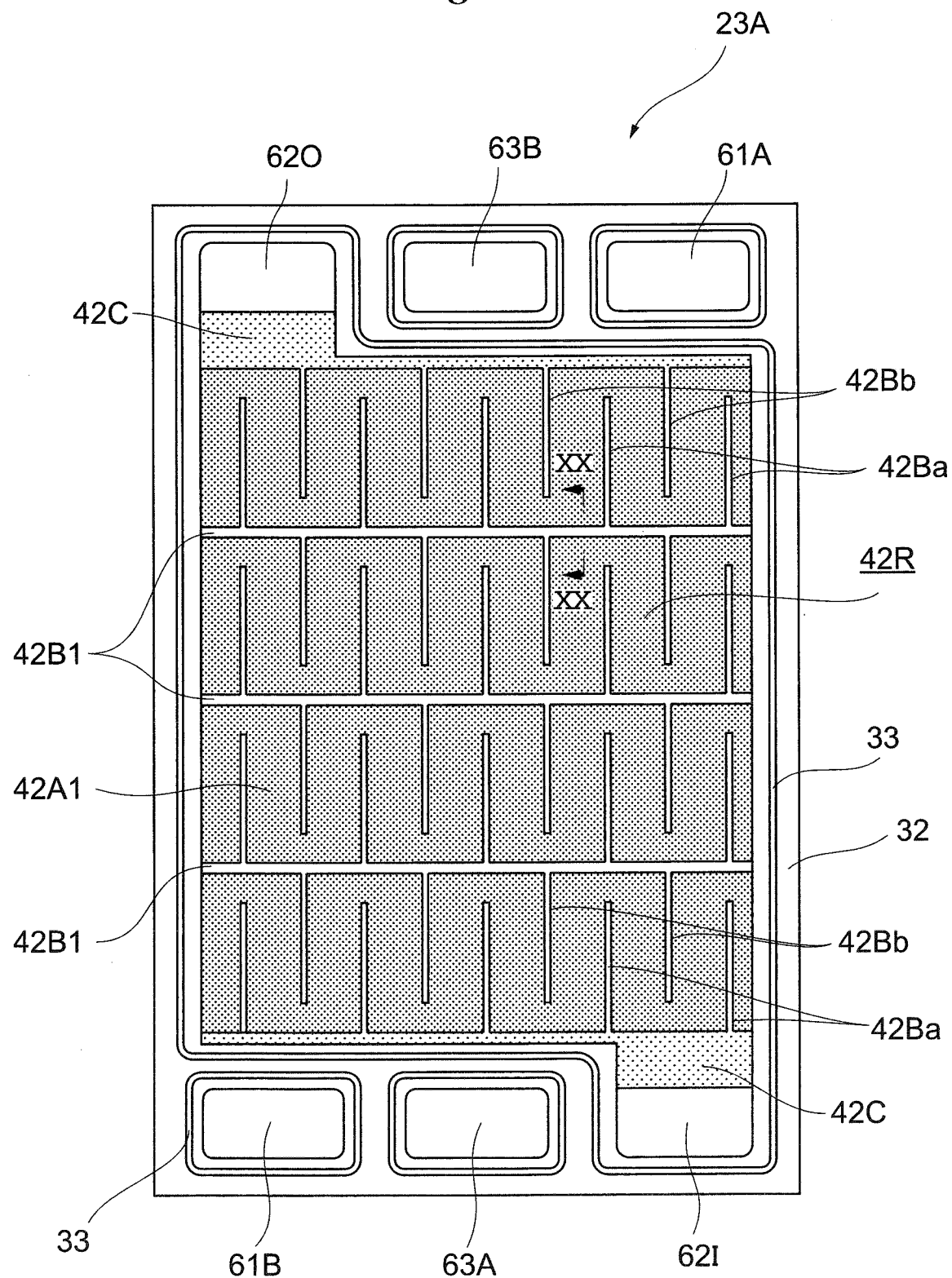
FIG. 19 is a plan view of a separator of type C.
Figure 20:
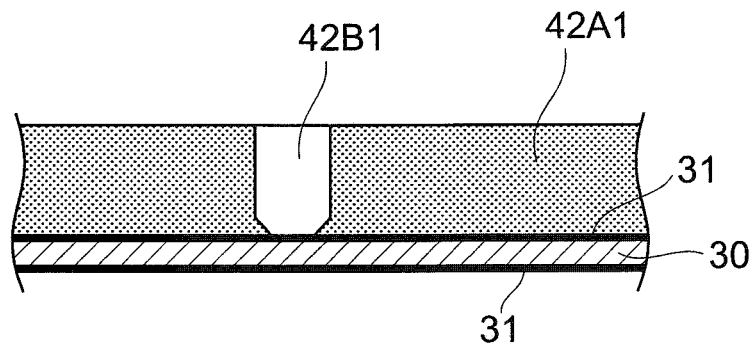
FIG. 20 is an enlarged sectional view taken along line XX-XX of FIG. 19.

With reference first to FIGS. 19 and 20, in a fluid (gas) supply and diffusion layer 42R within the dense frame 32 of separator 23A of type C, somewhat slender cathode-gas supply and diffusion portions (inlet, outlet portions) 42C are provided at locations facing respective ones of the cathode-gas (oxygen) inlet 62I and cathode-gas (oxygen) outlet 62O and, in connection with these, within the dense frame 32 over the entire width direction, a gas supply and diffusion layer 42A1 is provided over substantially the entirety of the gas supply and diffusion layer 42R (over the full width thereof in the width direction) between these gas supply and diffusion portions 42C. The fluid resistance of the supply and diffusion portions 42C is smaller than that of the diffusion layer 42A1 of the central portion. The characterizing feature here is that a gas-pressure equalization layer 42B1 is formed as a space (layer-shaped space, space layer or groove) within the gas supply and diffusion layer 42A1 [here the space is a space much larger (e.g., several tens of microns or more) than the pore space within the porous layer]. This space (layer) is a space of layer formed by surrounded by walls which are the surfaces of the gas supply and diffusion layer 42A1 (at least one side may be opened). Since this space layer can be expressed also as a gas-pressure equalization groove, the term "equalization groove" will be used below. The gas-pressure equalization groove 42B1 extends over the full width (transverse) direction of the gas supply and diffusion area 42R and the depth thereof substantially reaches down to the corrosion-resistant layer 31. The gas-pressure equalization groove 42B1 intersects the direction connecting the cathode inlet 62I and cathode outlet 62O. A plurality (three in this example) of the gas-pressure equalization grooves 42B1 are provided within the gas supply and diffusion area 42R along the longitudinal direction thereof and divide the supply and diffusion layer 42A1 into four stages.

Furthermore, a plurality of gas supply grooves (space layers) 42Ba the width whereof is smaller than that of the gas-pressure equalization groove 42B1 are formed longitudinally [in a direction at right angles to (intersecting) the equalization grooves 42B1] cutting into the supply and diffusion layer 42A1 from the supply and diffusion layer 42C or cutting into the supply and diffusion layer 42A1 from the gas-pressure equalization groove 42B1 (in either case not reaching the gas-pressure equalization groove 42B1 or supply and diffusion layer 42C by penetrating through the supply and diffusion layer 42A1). A plurality of gas discharge grooves (space layers) 42Bb of identical small width are formed from points along the supply and diffusion layer 42A1 to the gas-pressure equalization groove 42B1 or supply and diffusion layer portion 42C between these gas supply grooves 42Ba adjacent in the transverse direction. The depth of these grooves 42Ba, 42Bb is the same as that of the equalization layer 42B1.

Cathode gas supplied from the cathode-gas inlet 62I to the supply and diffusion layer portion 42C diffuses transversely within the supply and diffusion layer portion 42C (the supply and diffusion layer portion 42C functions also as an equalization layer). While the cathode gas is being diffused, some of the gas enters the gas supply grooves 42Ba and the rest of the gas enters the first-stage supply and diffusion layer 42A1 and travels in the direction of the cathode-gas outlet 62O while being diffused. The gas that has entered the interior of the gas supply grooves 42Ba enters the first-stage supply and diffusion layer 42A1 and some of this gas enters the gas discharge grooves 42Bb and reaches the first-stage equalization groove 42B1. All of the gas that has entered the supply and diffusion layer 42A1 of the first stage (that nearest the gas inlet 62I) reaches the first-stage equalization grooves 42S1 so that gas pressure is equalized in the width direction (transverse direction). The gas similarly passes through the supply and diffusion layers 42A1 of the second, third and fourth stages and the equalization grooves 42B1 of the second and third stages and reaches the gas outlet 62O from the supply and diffusion layer portion 42C. Naturally, the gas contributes to the power generating reaction in the course of traveling from the gas inlet 62I to the outlet 62O. The gas supply grooves 42Ba and gas discharge grooves 42Bb act as gas equalization layers as well.

Figure 21:
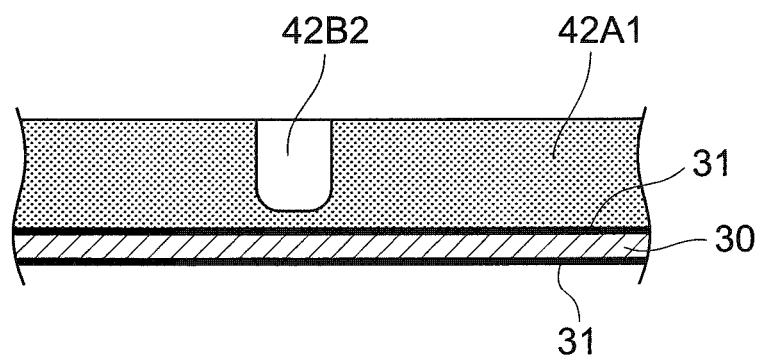
FIG. 21 is an enlarged sectional view, which corresponds to FIG. 20, illustrating a further embodiment.
Figure 22:
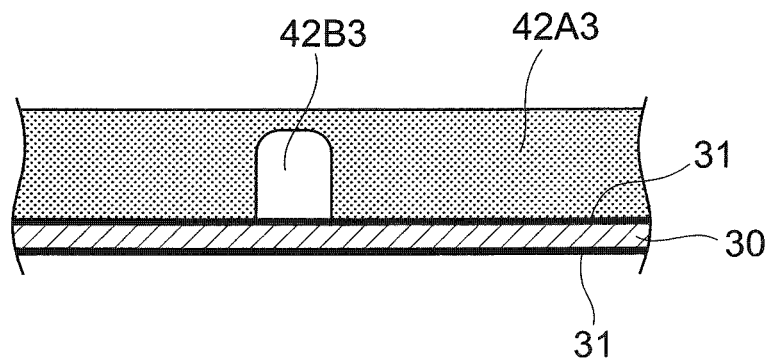
FIG. 22 is an enlarged sectional view, which corresponds to FIG. 20, illustrating a further embodiment.

As one example, the gas supply and diffusion layer 42A1 is fabricated by kneading carbon black and Teflon resin (PTFE) together. The compounding ratio is 7:3 (wt. %), by way of example. The carbon black and Teflon resin are dispersed in a water solution, aluminum nitrate is added and the solution is allowed to condense (settle). The uniformly mixed carbon black and Teflon resin are filtered, dried at 270° C. and then pulverized into powder. A sheet that will serve as the supply and diffusion layer 42A1 is fabricated from the power by using a hot press. A conductive bonding agent (a kneaded mixture of carbon black and epoxy resin) is applied to the interior of a flat metal plate on which the corrosion-resistant layer 31 and dense frame 32 have been formed and the above-mentioned sheet is affixed to the result by a hot press. If at this time use is made of a press having protrusions (protruding channel-like patterns) corresponding to equalization grooves 42B1, gas supply grooves 42Ba and gas discharge grooves 42Bb, etc., the grooves 42B1, 42Ba and 42Bb will be formed. If the height of the protruding channel-like patterns is reduced slightly, shallow equalization grooves 42B2 the depth of which will not reach down to the corrosion-resistant layer 31 can be produced, as shown in FIG. 21. If, prior to the affixing of the sheet to the flat metal plate, somewhat shallow grooves are formed in the sheet beforehand by a hot press and the sheet having the formed grooves is turned over and affixed to the corrosion-resistant layer 31 of the metal plate 30, then it is possible to fabricate an article in which downward-facing grooves (tunnels) (equalization grooves) 42B3 are formed inside a supply and diffusion layer 42A3, as illustrated in FIG. 22. At this time the gas supply grooves 42Ba and gas discharge grooves 42Bb can also be formed similarly into a tunnel-like shape and it may be arranged to accomplish this.

It should be noted that if the portions 42C of the supply and diffusion layer are not formed but spaces are left instead, many small support columns (the height of which is the same as the thickness of the supply and diffusion layer 42A1) may be formed in these spaces.

It goes without saying that this modification can be applied to the separators of types A and C.

Figure 23:
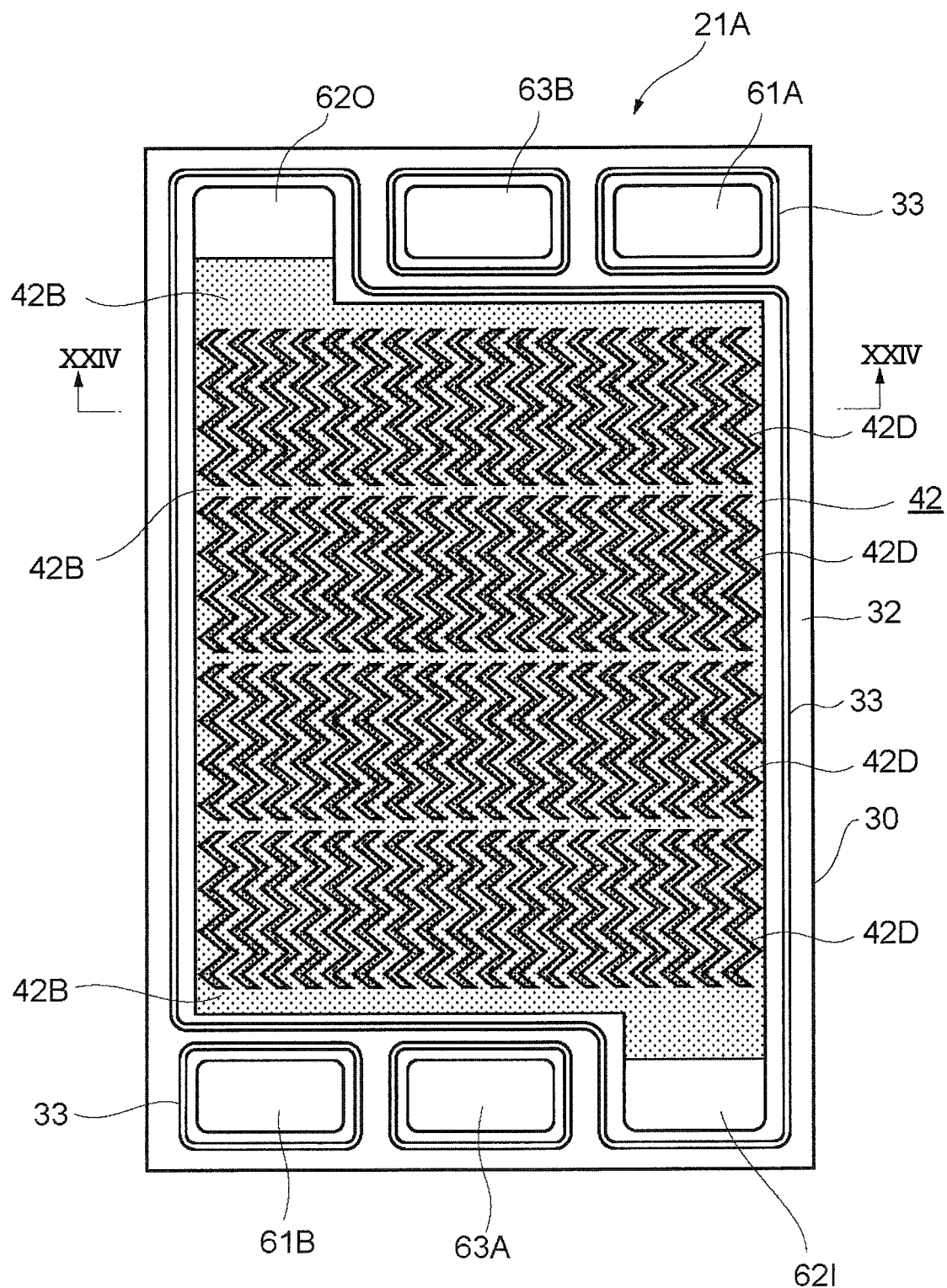
FIG. 23 is a plan view illustrating a modification of the separator of type CA.
Figure 24:
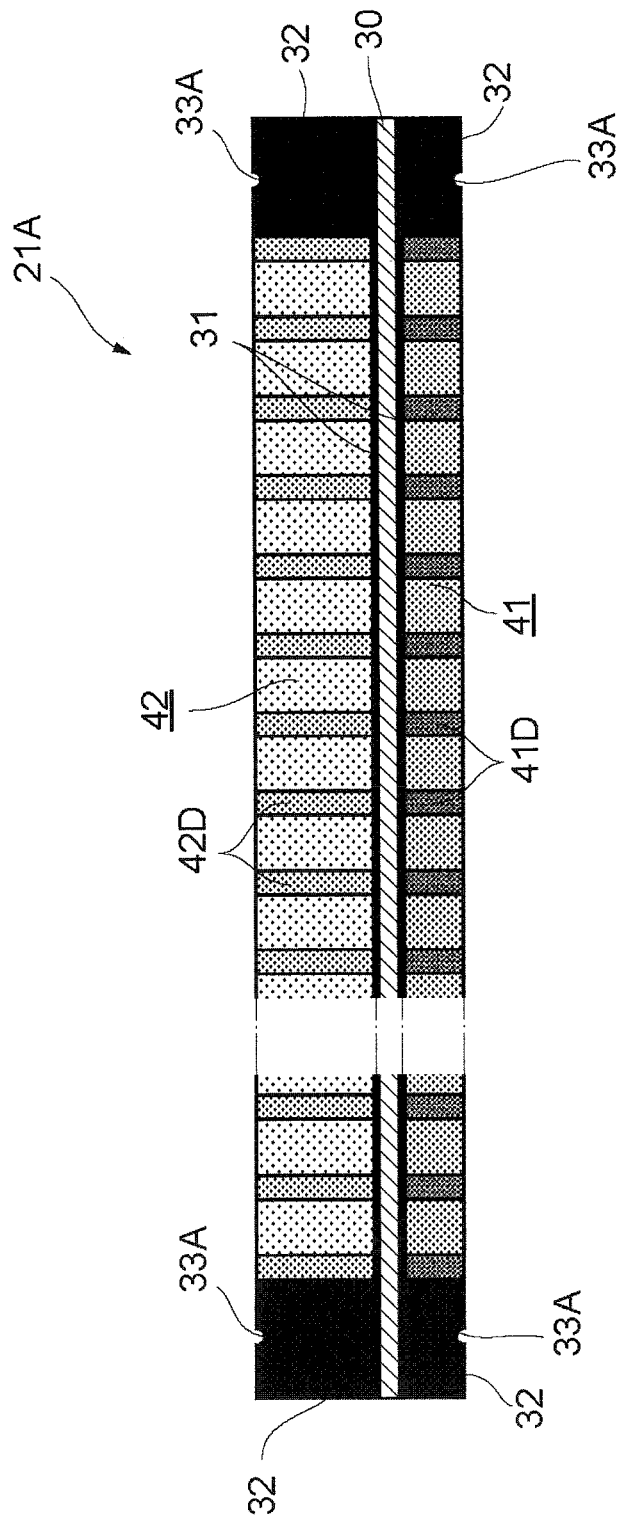
FIG. 24 is an enlarged sectional view taken along line XXIV-XXIV of FIG. 23.

FIGS. 23 and 24 illustrate a modification of a separator of type CA. This separator 21A is the same as the separator of the above-described embodiment (FIGS. 6, 7) in that the cathode-gas fluid supply and diffusion layer 42 is formed on one face of the metal plate 30 and the anode-gas fluid supply and diffusion layer 41 is formed on the other face. In this modification, ribs 41D, 42D are provided in the fluid supply and diffusion layers 41, 42.

The cathode-gas fluid supply and diffusion layer 42 will be described. Layers of rib groups are provided in multiple stages in the direction from the cathode gas inlet 62I to the outlet 62O. Each rib 42D has a zigzag shape in the direction of flow and the space between adjacent ribs is filled with a porous layer. The regions adjacent the cathode gas inlet 62I and outlet 62O and the areas between the rib groups are the gas-pressure equalization layers 42B. Each rib 42D is formed by a porous material having a fluid resistance greater than (a porosity less than) that of the fluid supply and diffusion layer 42. The height of rib 42D and the thickness (height) of the fluid supply and diffusion layer 42 are equal. The aim of the zigzag ribs is to promote the uniform diffusion of the cathode gas and the forcible elimination of product water steam or product liquid water. The anode-gas fluid supply and diffusion layer 41 also has the same purpose and construction.

Figure 25:
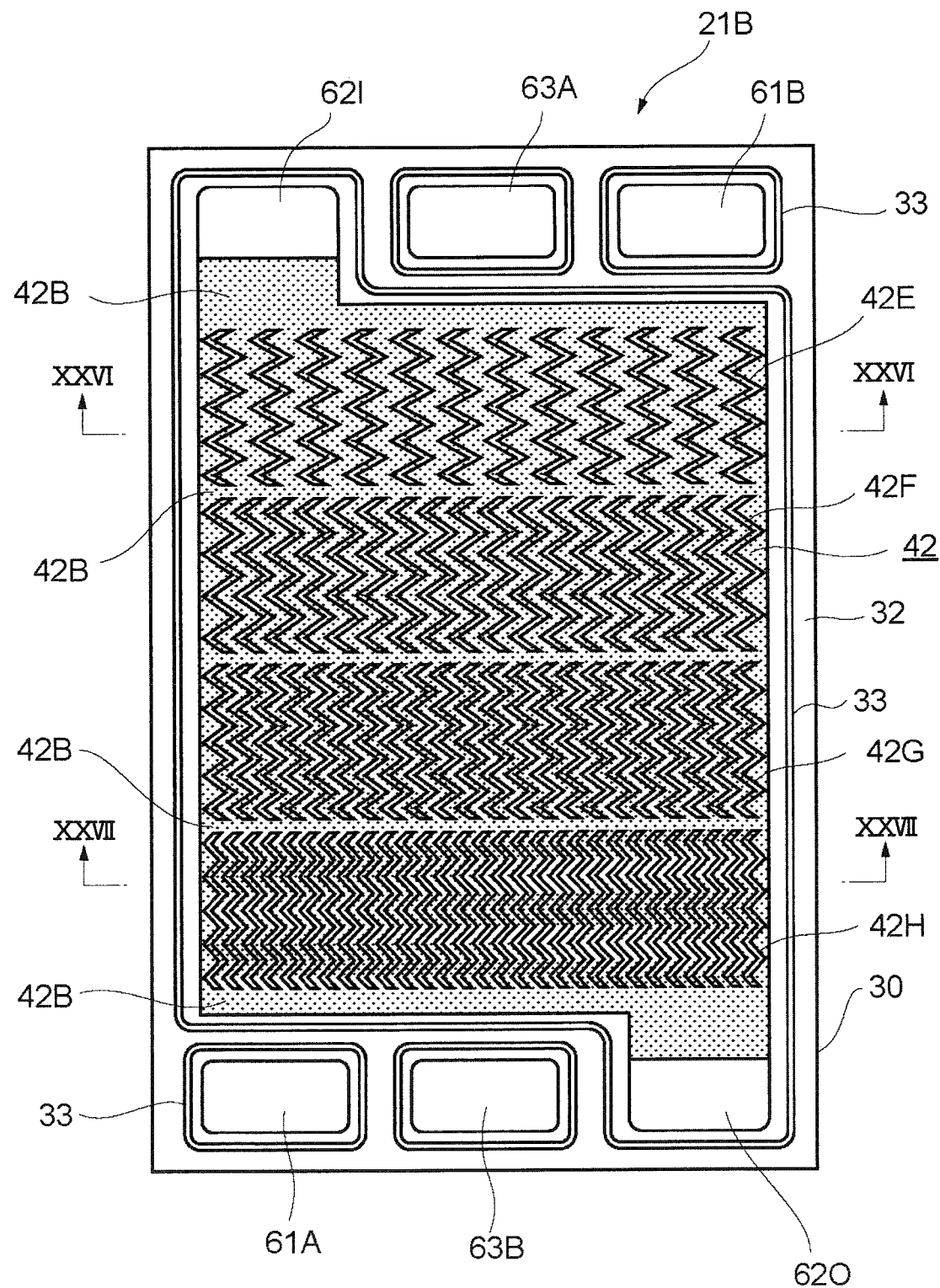
FIG. 25 is a plan view illustrating a further modification of the separator of type CA.
Figure 26:
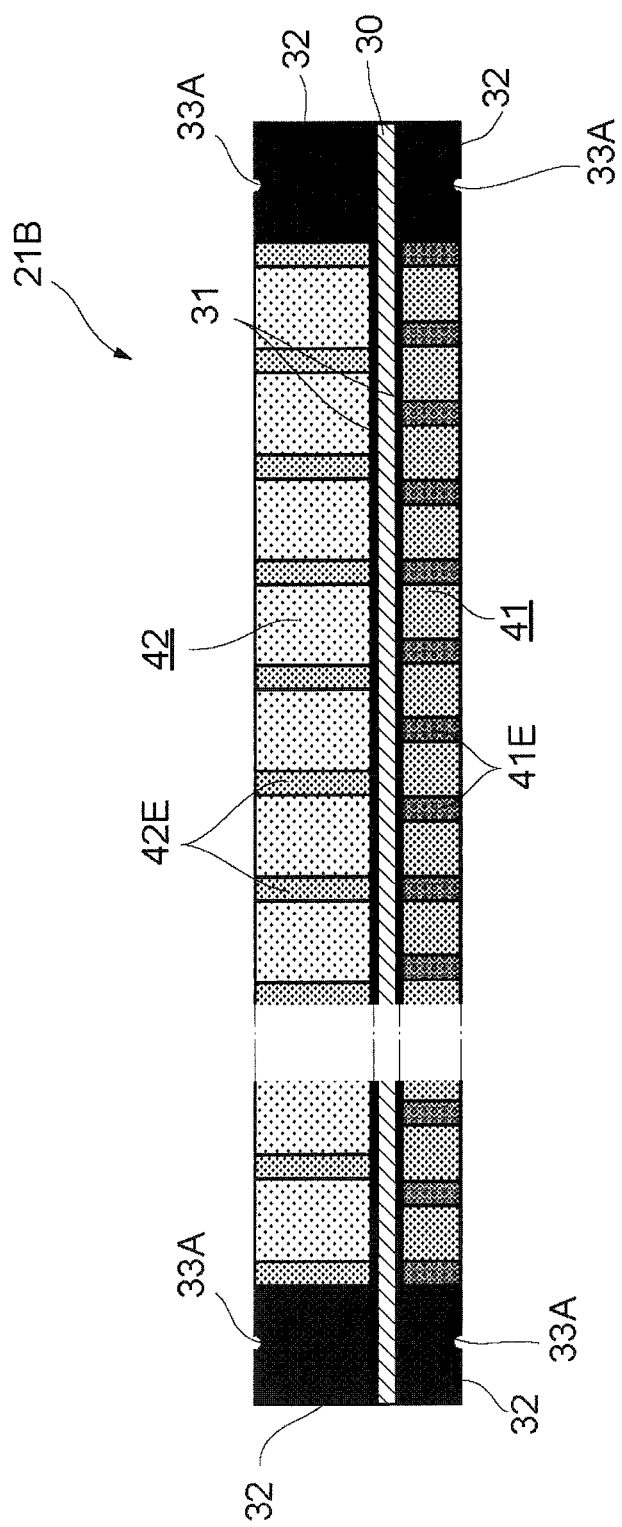
FIG. 26 is an enlarged sectional view taken along line XXVI-XXVI of FIG. 25.
Figure 27:
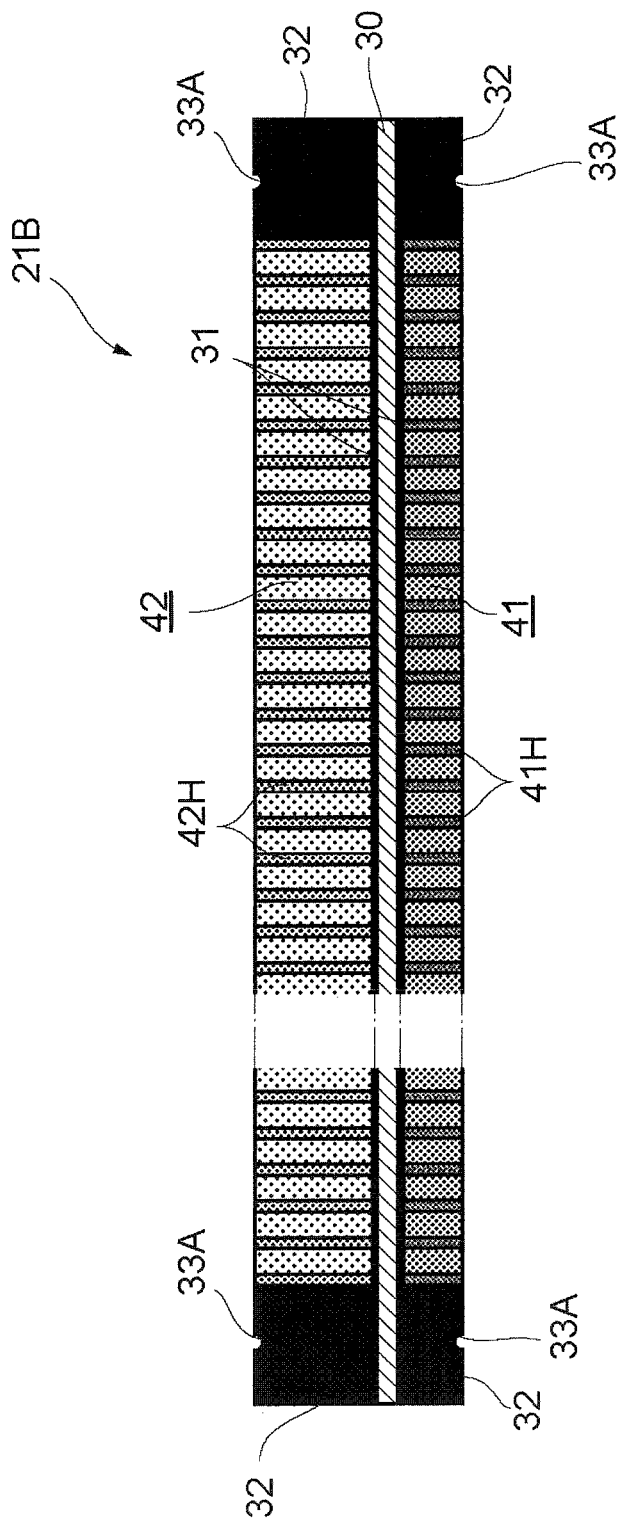
FIG. 27 is an enlarged sectional view taken along line XXVII-XXVII of FIG. 25.

FIGS. 25, 26 and 27 illustrate a further modification of a separator of type CA.

In this separator 21B, the positions of the oxygen inlet 62I and outlet 62O are the reverse of that described above. The fact that layers of rib groups are provided in multiple stages in the direction from the cathode gas inlet 62I to the outlet 62O is the same as that of the previous modification. However, the fineness of the zigzag shape of the ribs and the rib spacing vary for every rib-group layer. Specifically, while the zigzag shape of ribs 42E is large and the rib spacing great in the vicinity of the gas inlet 62I, the zigzag shape becomes finer and the rib spacing narrower, as in the manner of ribs 42F, 42G and 42H, as the ribs grow closer to the gas output 62O.

Figure 28:
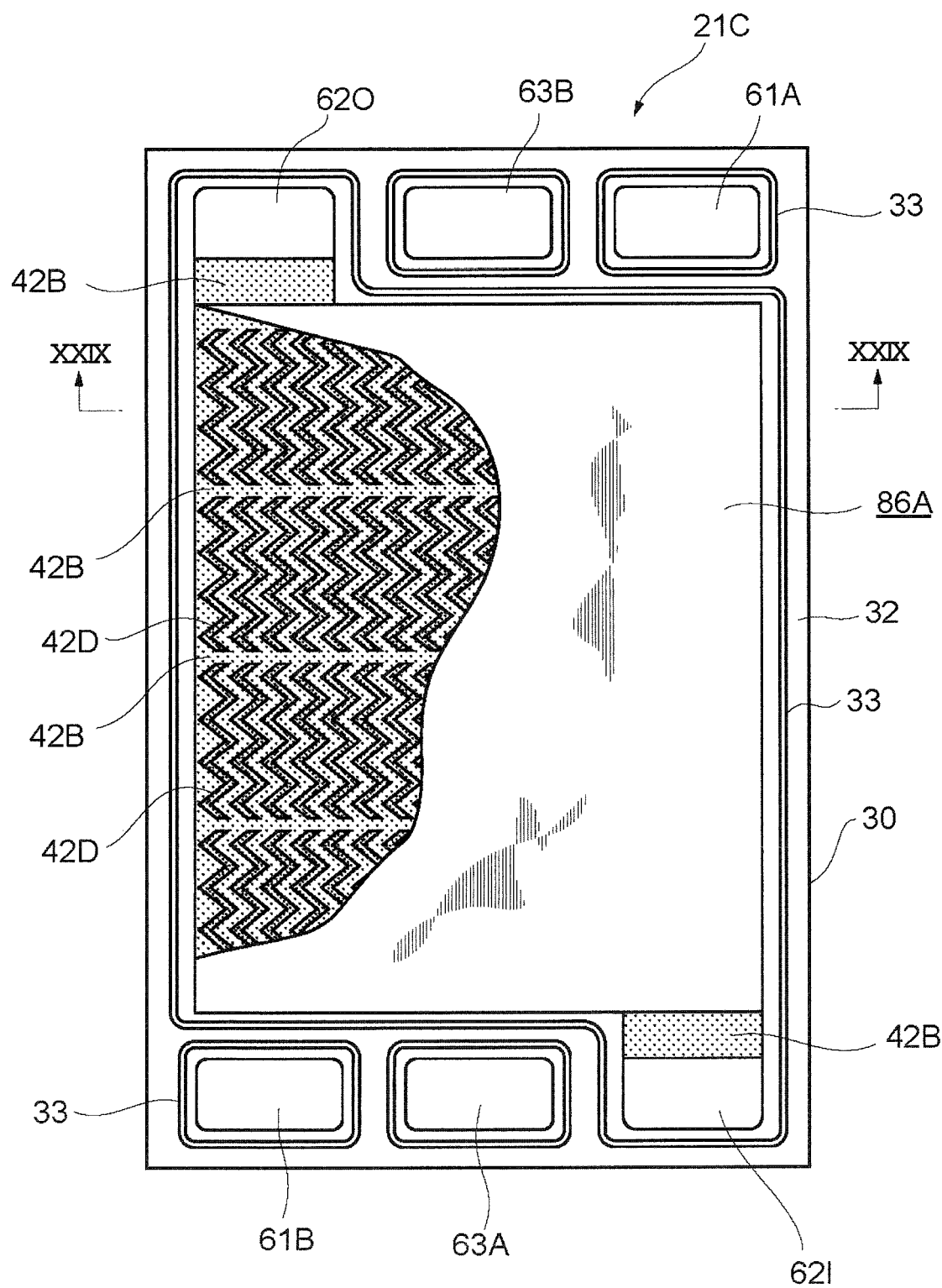
FIG. 28 is a plan view illustrating a further modification of the separator of type CA, in which another porous sheet has been joined to a fluid supply and diffusion layer atop the layer.
Figure 29:
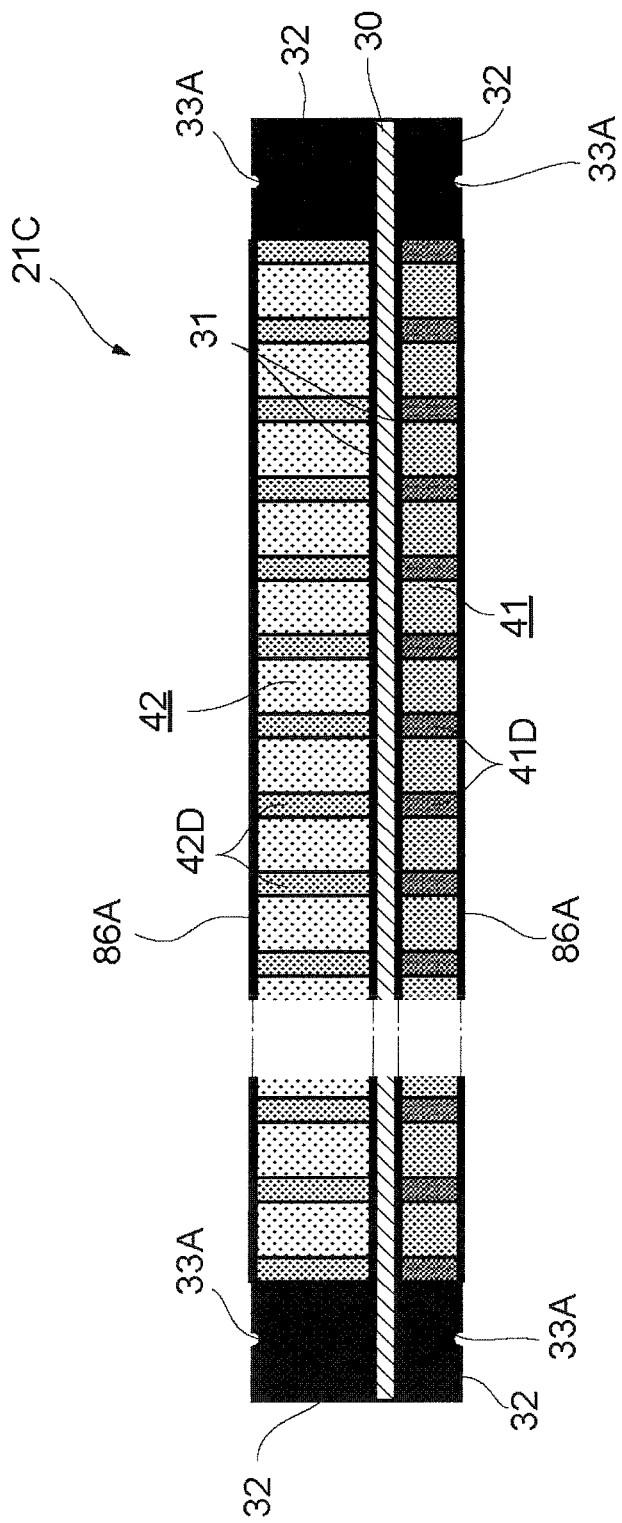
FIG. 29 is an enlarged sectional view taken along line XXIX-XXIX of FIG. 28.

FIGS. 28 and 29 illustrate a further modification of a separator of type CA. This separator 21C is such that the (micro) porous sheet 86A corresponding to the porous layer 86 (FIG. 34) is affixed to the surface of the fluid supply and diffusion layers 41, 42 (and ribs 41D, 42D) of the separator 21A shown in FIGS. 23 and 24. The porous sheet 86A covers the entire area (with the exception of the portions adjacent to the inlet 62I and outlet 62O) of the fluid supply and diffusion layers 41, 42. In a case where such a separator is used, the membrane electrode assembly (N-MEA) is constructed from the electrolyte layer 82 and catalyst layers 85 joined to both sides thereof; no use is made of the porous layer 86.

Although the foregoing modifications have been described with regard to the separator of type CA, it goes without saying that the modifications can also be applied to the cathode-gas or anode-gas fluid supply and diffusion layers of the other types of separators.

Figure 30:
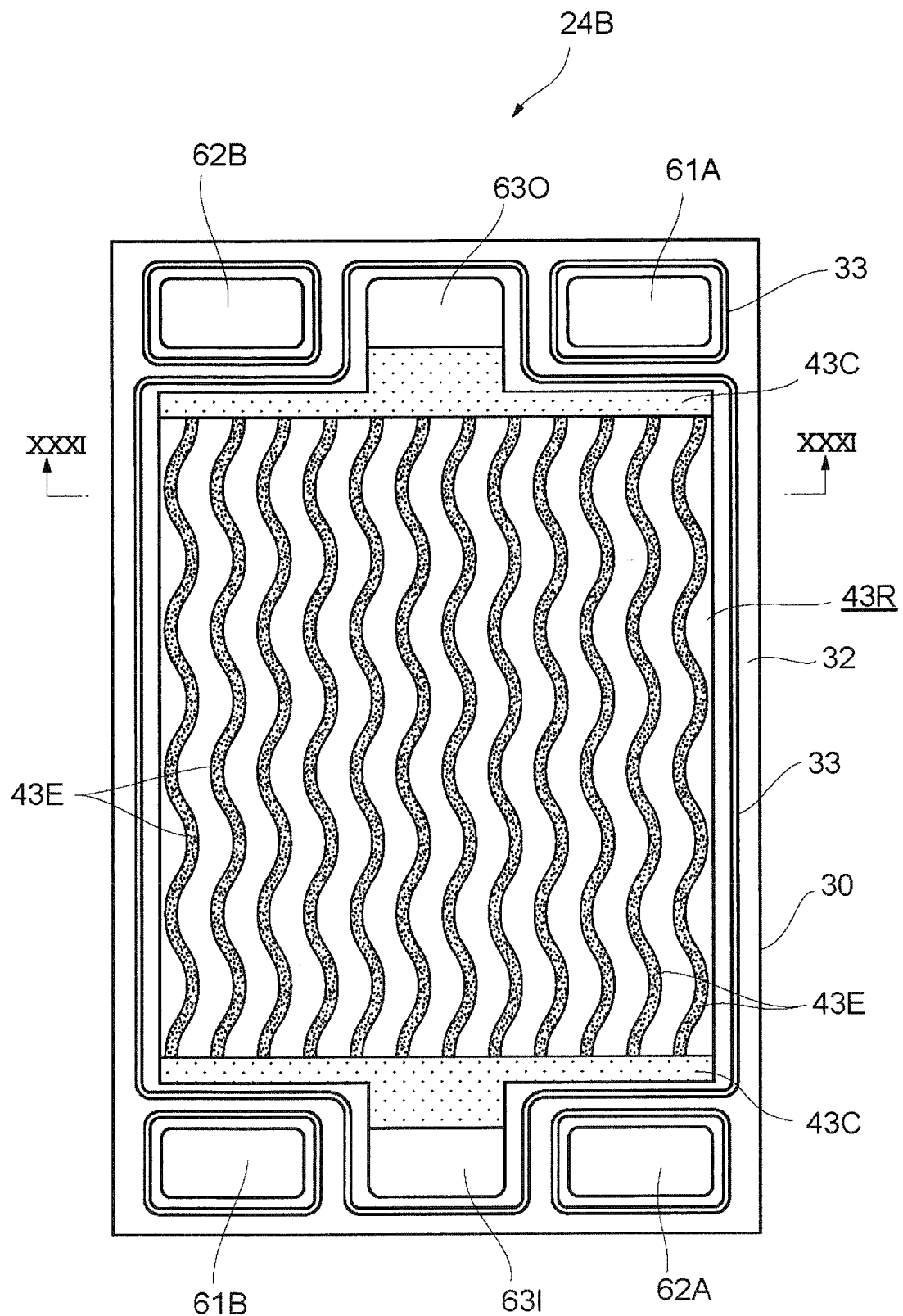
FIG. 30 is a plan view illustrating a further modification of the separator of type AW.
Figure 31:
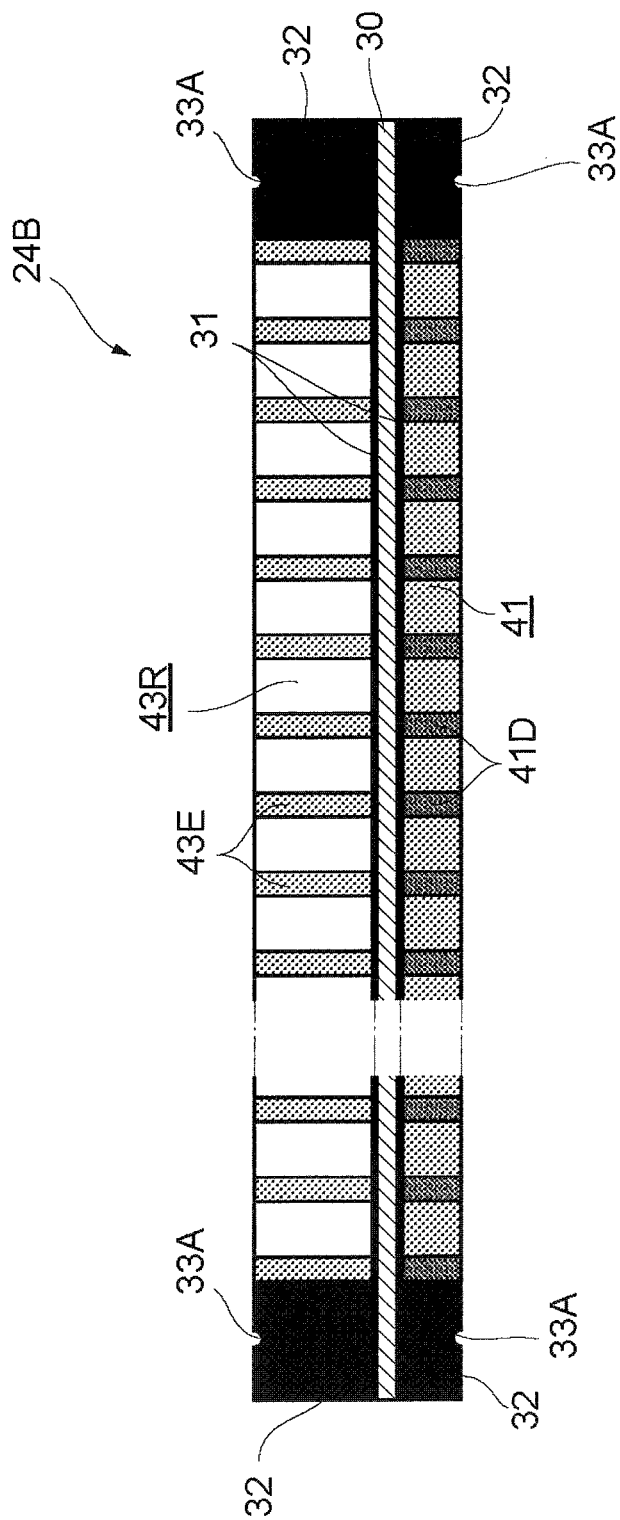
FIG. 31 is an enlarged sectional view taken along line XXXI-XXXI of FIG. 30.

FIGS. 30 and 31 illustrate a modification of the separator 24 of type AW (FIGS. 12 and 13). This separator 24B is such that, on the side of the fluid supply and diffusion layer for the coolant, the fluid supply and diffusion layers 43C provided in contact with respective ones of the coolant inlet 63I and coolant outlet 63O perform the role of equalization layers, and wave-shaped ribs 43E are provided in spaced-apart relation in the fluid supply and diffusion layer region (space)

43R between these fluid supply and diffusion layers 43C so as to form coolant flow paths. The ribs 43E contact the fluid supply and diffusion layers 43C and are formed of a (micro) porous material.

Although wave-shaped ribs 41D are formed likewise on the anode-gas fluid supply and diffusion layer 41, the spaces between the ribs 41D are filled with the porous material of the fluid supply and diffusion layer (this is a structure identical with that shown in FIG. 24).

Figure 32:
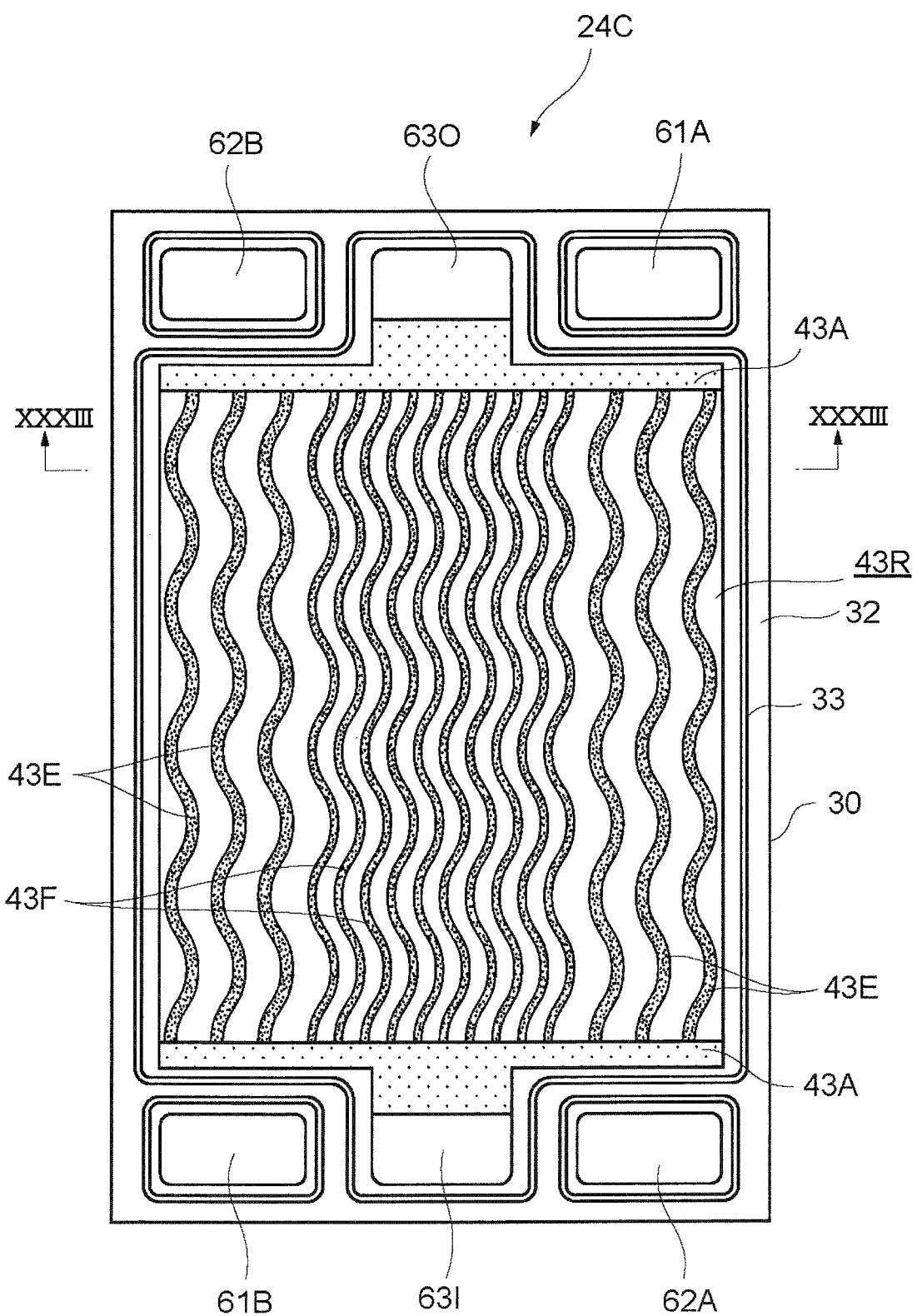
FIG. 32 is a plan view illustrating a further modification of the separator of type AW.
Figure 33:
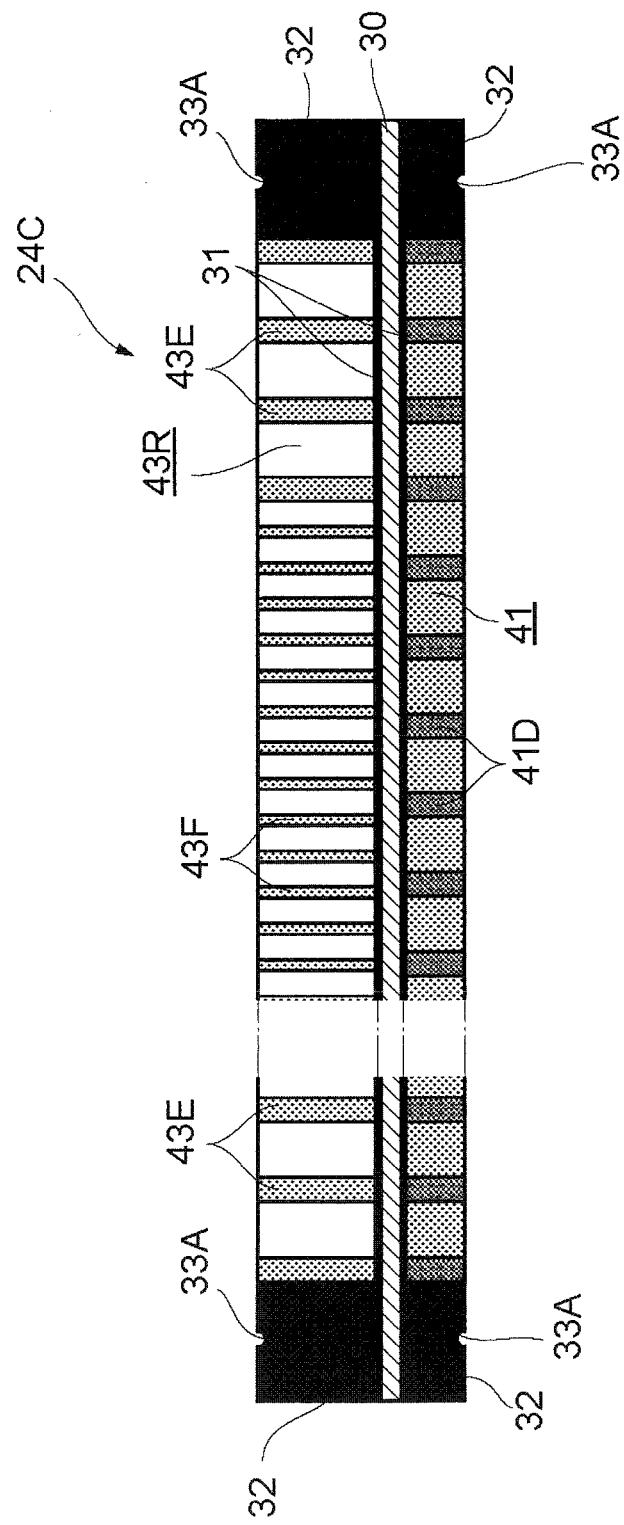
FIG. 33 is an enlarged sectional view taken along line XXXIII-XXXIII of FIG. 32.

FIGS. 32 and 33 illustrate a further embodiment. In this separator 24C of type AW, ribs provided in the coolant supply and diffusion layer region 43R are such that, in the direction orthogonal to the direction in which the coolant flows, ribs (ribs 43E) on the outer side have a large spacing while those ribs 43F in the middle have a small spacing. Thus, the separator is contrived such that the coolant will flow substantially equally over the separator 24C in the width direction thereof.

In the description rendered above, all of the fluids (hydrogen, oxygen, coolant) flow in the longitudinal direction of the separators. However, the positions of all or some of the supply holes and discharge holes may be decided in such a manner that the fluids will flow in the transverse direction, which is the direction in which the distance traveled is shorter.

It is preferred that the porous layer be made water-repellent or hydrophilic depending upon circumstances such as optimum operating conditions. It is preferred that the porous layer 86 or porous sheet 86A be made hydrophilic.

As many apparently widely different embodiments of the present invention can be made without departing from the spirit and scope thereof, it is to be understood that the invention is not limited to the specific embodiments thereof except as defined in the appended claims.

What is claimed is:

1. A separator for a fuel cell, wherein a fluid supply and diffusion layer is formed by a porous layer on at least one face of a flat metal plate; and
   an equalization layer extending in a direction that obliquely or orthogonally intersects a direction from a fluid supply side to a fluid discharge side is formed on said fluid supply and diffusion layer, as a part thereof, at least on the fluid supply side;
   wherein the equalization layer equalizes fluid pressure or flow rate in a width direction; and
   wherein the equalization layer has a fluid resistance different from that of the remainder of the fluid supply and diffusion layer.

2. The separator according to claim 1, wherein the periphery of at least one face of said metal plate is surrounded by a frame, said fluid supply and diffusion layer is formed on the entire surface within said frame with the exception of a fluid supply port and fluid discharge port, and said equalization layer extends over the full width of said frame.

3. The separator according to claim 1, wherein a sealing layer is formed on at least one face of said metal plate, and said fluid supply and diffusion layer is formed on said sealing layer.

4. The separator according to claim 1, wherein a sealing layer is formed on both faces of said metal plate.

5. The separator according to claim 1, wherein the equalization layers are formed in mutually spaced-apart relation in a region contiguous to the fluid supply port, a region contiguous to the fluid discharge port and a region between these two regions.

6. The separator according to claim 1, wherein the equalization layers are formed in a region spaced away from the supply port on the fluid supply side and in a region spaced away from the discharge port on the fluid discharge side.

7. The separator according to claim 1, wherein said equalization layer is a porous layer having a fluid resistance smaller than that of the remainder of the fluid supply and diffusion layer.

8. The separator according to claim 1, wherein said equalization layer is a porous layer having a fluid resistance larger than that of the remainder of the fluid supply and diffusion layer.

9. The separator according to claim 1, wherein said equalization layer is a layer-shaped space or a groove formed inside said fluid supply and diffusion layer.

10. The separator according to claim 9, wherein the layer-shaped space or groove is a tunnel groove or a groove having an opening on a side of the metal plate.

11. The separator according to claim 9, wherein a gas supply groove or gas discharge groove is formed contiguous with the equalization layer.

12. The separator according to claim 1, wherein a fluid supply and diffusion layer for one of two types of reactant gas is formed on one face of said metal plate, and a fluid supply and diffusion layer for the other of the two types of reactant gas is formed on the other face of said metal plate.

13. The separator according to claim 1, wherein a fluid supply and diffusion layer for reactant gas is formed on only one face of said metal plate.

14. The separator according to claim 1, wherein a fluid supply and diffusion layer for reactant gas is formed on one face of said metal plate and a fluid supply and diffusion layer for coolant is formed on the other face of said metal plate.

15. The separator according to claim 1, wherein a fluid supply and diffusion layer for coolant is formed on only one face of said metal plate.

16. The separator according to claim 1, wherein multiple ribs comprising a porous material are formed in a region of said fluid supply and diffusion layer other than in said equalization layer so as to define fluid flow paths from the fluid supply side to the fluid discharge side.

17. The separator according to claim 16, wherein fluid resistance of said ribs is larger than that of the porous layer of said equalization layer.

18. The separator according to claim 16, wherein said ribs are formed into a wave shape.

19. The separator according to claim 16, wherein spacing or width of adjacent ribs varies from the fluid supply side to the fluid discharge side.

20. The separator according to claim 1, wherein a fluid supply and diffusion layer for reactant gas is formed on one face of said metal plate and a rib structure that defines coolant flow paths is formed on the other face of said metal plate.

21. A separator for a fuel cell, wherein a sealing layer is formed on at least one face of a flat metal plate, which includes a material showing corrosion resistant property on at least said one face, and a fluid supply and diffusion layer is formed by a porous layer on said sealing layer;
   an equalization layer extending in a direction that obliquely or orthogonally intersects a direction from a fluid supply side to a fluid discharge side is formed on said fluid supply and diffusion layer, as a part thereof, at least on the fluid supply side;
   wherein the equalization layer equalizes fluid pressure or flow rate in a width direction; and
   wherein the equalization layer has a fluid resistance different from that of the remainder of the fluid supply and diffusion layer.

22. The separator according to claim 21, wherein the periphery of at least one face of said metal plate is surrounded by a frame, and said fluid supply and diffusion layer is formed on the entire surface within said frame with the exception of a fluid supply port and fluid discharge port.

23. The separator according to claim 21, wherein an equalization layer extending in a direction that intersects a direction from a fluid supply side to a fluid discharge side is formed on said fluid supply and diffusion layer, as a part thereof, at least on the fluid supply side.

24. A separator for a fuel cell, wherein a porous sheet is further affixed to the surface of the fluid supply and diffusion layer of the separator set forth in claim 1.

25. A separator for coolant in a fuel cell, wherein a sealing layer is formed on at least one face of a flat metal plate, which includes a material showing corrosion resistant property on at least said one face, a frame is formed on the periphery of said sealing layer, equalization layers are formed within said frame in the vicinity of respective ones of a coolant supply port and discharge port over the entire width of said frame, and coolant flow paths are formed between said equalization layers by ribs or layers of a porous material;

wherein a fluid supply and diffusion layer is formed by a porous layer on at least one face of the flat metal plate; and the equalization layers extend in a direction that obliquely or orthogonally intersects a direction from a fluid supply side to a fluid discharge side and are formed on said fluid supply and diffusion layer, as a part thereof, at least on the fluid supply side;

wherein the equalization layers equalize fluid pressure or flow rate in a width direction; and wherein the equalization layers have a fluid resistance different from that of the remainder of the fluid supply and diffusion layer.

26. A cell stack for a fuel cell which includes separators according to claim 1.

27. A cell stack for a fuel cell which includes separators of at least two types for a cathode gas and an anode gas;

wherein each separator is such that a fluid supply and diffusion layer for a corresponding gas is formed by a porous layer on at least one face of a flat metal plate; an equalization layer extending in a direction that obliquely or orthogonally intersects a direction from a fluid supply side to a fluid discharge side is formed on said fluid supply and diffusion layer, as a part thereof, on at least the fluid supply side; and the at least two separators are stacked so as to face each other with at least an electrolyte membrane and catalyst layers on both sides of said membrane being sandwiched between said fluid supply and diffusion layers;

wherein the equalization layer equalizes fluid pressure or flow rate in a width direction; and wherein the equalization layer has a fluid resistance different from that of the remainder of the fluid supply and diffusion layer.

28. A cell stack for a fuel cell which includes separators of at least two types for a cathode gas and an anode gas;

wherein each separator is such that a sealing layer is formed on at least one face of a flat metal plate, which includes a material showing corrosion resistant property on at least said one face, a fluid supply and diffusion layer for a corresponding gas is formed by a porous layer on said sealing layer, and the at least two separators are stacked so as to face each other with at least an electrolyte membrane and catalyst layers on both sides of said membrane being sandwiched between the fluid supply and diffusion layers;

wherein the separator further comprises an equalization layer extending in a direction that obliquely or orthogonally intersects a direction from a fluid supply side to a fluid discharge side is formed on said fluid supply and diffusion layer, as a part thereof, at least on the fluid supply side;

wherein the equalization layer equalizes fluid pressure or flow rate in a width direction; and wherein the equalization layer has a fluid resistance different from that of the remainder of the fluid supply and diffusion layer.

29. The cell stack according to claim 28, wherein an equalization layer extending in a direction that intersects a direction from a gas supply side to a gas discharge side is formed on said fluid supply and diffusion layer, as a part thereof, on at least the gas supply side.

30. The cell stack according to claim 27, wherein a porous sheet is further affixed to the surface of the fluid supply and diffusion layer of said separator.

31. The cell stack according to claim 27, wherein said fluid supply and diffusion layer is surrounded by a frame.

32. The cell stack according to claim 27, said stack further including a separator for coolant in which a sealing layer is formed on at least one face of a metal plate and coolant flow paths are formed by a porous material on said sealing layer.

33. A cell stack for a fuel cell which includes separators according to claim 21.

34. A cell stack for a fuel cell which includes separators according to claim 25.

35. The separator according to claim 1, wherein the fluid supply and diffusion layer comprises a groove or space layer.

36. The separator according to claim 21, wherein the fluid supply and diffusion layer comprises a groove or space layer.

37. The cell stack according to claim 27, wherein the fluid supply and diffusion layer comprises a groove or space layer.

38. The cell stack according to claim 28, wherein the fluid supply and diffusion layer comprises a groove or space layer.

* * * * *